(12) United States Patent
Steinberg et al.

(10) Patent No.: US 11,200,080 B1
(45) Date of Patent: Dec. 14, 2021

(54) LATE LOAD TECHNIQUE FOR DEPLOYING A VIRTUALIZATION LAYER UNDERNEATH A RUNNING OPERATING SYSTEM

(71) Applicant: FireEye, Inc., Milpitas, CA (US)

(72) Inventors: Udo Steinberg, Braunschweig (DE); Neeraj Sanjeev Kulkarni, Santa Clara, CA (US)

(73) Assignee: FireEye Security Holdings US LLC, Milpitas, CA (US)

( * ) Notice: Subject to any disclaimer, the term of this patent is extended or adjusted under 35 U.S.C. 154(b) by 0 days.

(21) Appl. No.: 16/160,923

(22) Filed: Oct. 15, 2018

Related U.S. Application Data

(63) Continuation of application No. 15/229,770, filed on Aug. 5, 2016, now Pat. No. 10,108,446.

(Continued)

(51) Int. Cl.
  *G06F 12/1009* (2016.01)
  *G06F 12/1027* (2016.01)
  *G06F 9/455* (2018.01)

(52) U.S. Cl.
  CPC ...... *G06F 9/45558* (2013.01); *G06F 12/1009* (2013.01); *G06F 12/1027* (2013.01);

(Continued)

(58) Field of Classification Search
  CPC ............. G06F 9/45558; G06F 12/1009; G06F 12/1027; G06F 2009/45583; G06F 2212/657

See application file for complete search history.

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

Silicon Defense, "Worm Containment in the Internal Network", (Mar. 2003), pp. 1-25.

(Continued)

*Primary Examiner* — Nanci N Wong
(74) *Attorney, Agent, or Firm* — Rutan & Tucker, LLP

(57) ABSTRACT

A technique deploys a virtualization layer underneath an operating system executing on a node of a network environment to enable the virtualization layer to control the operating system is described. One or more executables (binaries) for the virtualization layer may be included in a kernel module loaded in memory of the node with a first privilege level (e.g., highest privilege level) needed to control the guest operating system. The kernel module may be configured to suspend the guest operating system and one or more hardware resources to a quiescent state. Furthermore, the kernel module is configured to (i) capture and save states of the hardware resource(s) and (ii) bootstrap the virtualization layer to create a virtual machine with an initial state that corresponds to a state of the system prior to deployment of the virtualization layer.

22 Claims, 6 Drawing Sheets

Related U.S. Application Data

(60) Provisional application No. 62/266,129, filed on Dec. 11, 2015.

(52) U.S. Cl.
CPC .............. *G06F 2009/45583* (2013.01); *G06F 2212/657* (2013.01)

(56) References Cited

U.S. PATENT DOCUMENTS

| | | | |
|---|---|---|---|
| 5,319,776 A | 6/1994 | Hile et al. | |
| 5,440,723 A | 8/1995 | Arnold et al. | |
| 5,490,249 A | 2/1996 | Miller | |
| 5,657,473 A | 8/1997 | Killean et al. | |
| 5,802,277 A | 9/1998 | Cowland | |
| 5,842,002 A | 11/1998 | Schnurer et al. | |
| 5,960,170 A | 9/1999 | Chen et al. | |
| 5,978,917 A | 11/1999 | Chi | |
| 5,983,348 A | 11/1999 | Ji | |
| 6,088,803 A | 7/2000 | Tso et al. | |
| 6,092,194 A | 7/2000 | Touboul | |
| 6,094,677 A | 7/2000 | Capek et al. | |
| 6,108,799 A | 8/2000 | Boulay et al. | |
| 6,154,844 A | 11/2000 | Touboul et al. | |
| 6,269,330 B1 | 7/2001 | Cidon et al. | |
| 6,272,641 B1 | 8/2001 | Ji | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sorhaug et al. | |
| 6,442,696 B1 | 8/2002 | Wray et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,831,893 B1 | 12/2004 | Ben Nun et al. | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,941,348 B2 | 9/2005 | Petryetai. | |
| 6,961,806 B1 | 11/2005 | Agesen et al. | |
| 6,971,097 B1 | 11/2005 | Wallman | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,058,822 B2 | 6/2006 | Edery et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,096,498 B2 | 8/2006 | Judge | |
| 7,100,201 B2 | 8/2006 | Izatt | |
| 7,107,617 B2 | 9/2006 | Hursey et al. | |
| 7,159,149 B2 | 1/2007 | Spiegel et al. | |
| 7,213,260 B2 | 5/2007 | Judge | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,243,371 B1 | 7/2007 | Kasper et al. | |
| 7,249,175 B1 | 7/2007 | Donaldson | |
| 7,287,278 B2 | 10/2007 | Liang | |
| 7,308,716 B2 | 12/2007 | Danford et al. | |
| 7,328,453 B2 | 2/2008 | Merkle, Jr. et al. | |
| 7,346,486 B2 | 3/2008 | Ivancic et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,478,428 B1 | 1/2009 | Thomlinson | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,546,638 B2 | 6/2009 | Anderson et al. | |
| 7,565,550 B2 | 7/2009 | Liang et al. | |
| 7,568,233 B1 | 7/2009 | Szor et al. | |
| 7,584,455 B2 | 9/2009 | Ball | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,657,419 B2 | 2/2010 | van der Made | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,712,136 B2 | 5/2010 | Sprosts et al. | |
| 7,730,011 B1 | 6/2010 | Deninger et al. | |
| 7,739,740 B1 | 6/2010 | Nachenberg et al. | |
| 7,779,463 B2 | 8/2010 | Stolfo et al. | |
| 7,784,097 B1 | 8/2010 | Stolfo et al. | |
| 7,814,495 B1 * | 10/2010 | Lim ................... G06F 9/45558 718/104 |
| 7,832,008 B1 | 11/2010 | Kraemer | |
| 7,836,502 B1 | 11/2010 | Zhao et al. | |
| 7,849,506 B1 | 12/2010 | Dansey et al. | |
| 7,854,007 B2 | 12/2010 | Sprosts et al. | |
| 7,865,893 B1 * | 1/2011 | Omelyanchuk ..... G06F 9/45558 718/1 |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,387 B2 | 5/2011 | Frazier et al. | |
| 7,937,761 B1 | 5/2011 | Bennett | |
| 7,949,849 B2 | 5/2011 | Lowe et al. | |
| 7,996,556 B2 | 8/2011 | Raghavan et al. | |
| 7,996,836 B1 | 8/2011 | McCorkendale et al. | |
| 7,996,904 B1 | 8/2011 | Chiueh et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,042,184 B1 | 10/2011 | Batenin | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,104,034 B2 | 1/2012 | Drepper | |
| 8,171,553 B2 | 5/2012 | Aziz et al. | |
| 8,176,049 B2 | 5/2012 | Deninger et al. | |
| 8,176,480 B1 | 5/2012 | Spertus | |
| 8,201,246 B1 | 6/2012 | Wu et al. | |
| 8,204,984 B1 | 6/2012 | Aziz et al. | |
| 8,214,905 B1 | 7/2012 | Doukhvalov et al. | |
| 8,220,055 B1 | 7/2012 | Kennedy | |
| 8,225,288 B2 | 7/2012 | Miller et al. | |
| 8,225,317 B1 | 7/2012 | Chiueh et al. | |
| 8,225,373 B2 | 7/2012 | Kraemer | |
| 8,233,882 B2 | 7/2012 | Rogel | |
| 8,234,640 B1 | 7/2012 | Fitzgerald et al. | |
| 8,234,709 B2 | 7/2012 | Viljoen et al. | |
| 8,239,944 B1 | 8/2012 | Nachenberg et al. | |
| 8,260,914 B1 | 9/2012 | Ranjan | |
| 8,266,091 B1 | 9/2012 | Gubin et al. | |
| 8,271,978 B2 | 9/2012 | Bennett et al. | |
| 8,286,251 B2 | 10/2012 | Eker et al. | |
| 8,291,499 B2 | 10/2012 | Aziz et al. | |

(56) References Cited

U.S. PATENT DOCUMENTS

| | | |
|---|---|---|
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,387,046 B1 | 2/2013 | Montague et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,286 B2 | 7/2013 | Dalcher et al. |
| 8,479,291 B1 | 7/2013 | Bodke |
| 8,479,292 B1 | 7/2013 | Linhardt |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,236 B2 | 8/2013 | Zimmer et al. |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,656,482 B1 | 2/2014 | Tosa et al. |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,775,715 B2 | 7/2014 | Tsirkin et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,352 B2 | 9/2014 | Tsirkin et al. |
| 8,832,829 B2 | 9/2014 | Manni et al. |
| 8,839,245 B1 | 9/2014 | Khajuria et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,003,402 B1 | 4/2015 | Carbone et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,092,625 B1 | 7/2015 | Kashyap et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,264 B1 | 11/2015 | Steffen |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,436,619 B2 | 9/2016 | Woolley |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,459,912 B1 | 10/2016 | Durniak et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |

(56) References Cited

U.S. PATENT DOCUMENTS

| | | |
|---|---|---|
| 9,740,857 B2 | 8/2017 | Ismael et al. |
| 9,747,446 B1 | 8/2017 | Pidathala et al. |
| 9,753,754 B2 | 9/2017 | Howell et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,592 B2 | 12/2017 | Sarangdhar et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,447,728 B1 | 10/2019 | Steinberg |
| 10,846,117 B1 | 11/2020 | Steinberg |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0078121 A1 | 6/2002 | Ballantyne |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Fang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0037089 A1 | 2/2003 | Cota-Robles et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0120856 A1 | 6/2003 | Neiger et al. |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2004/0268347 A1 | 12/2004 | Knauerhase et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091365 A1* | 4/2005 | Lowell ............... G06F 9/45533 709/224 |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0216759 A1 | 9/2005 | Rothman et al. |
| 2005/0216920 A1 | 9/2005 | Tewari et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |

(56) References Cited

U.S. PATENT DOCUMENTS

| | | |
|---|---|---|
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0130060 A1 | 6/2006 | Anderson et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0184713 A1 | 8/2006 | Hildner |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248528 A1 | 11/2006 | Oney et al. |
| 2006/0248582 A1 | 11/2006 | Panjwani et al. |
| 2006/0251104 A1 | 11/2006 | Koga |
| 2006/0288189 A1* | 12/2006 | Seth .................. G06F 12/0888 711/207 |
| 2006/0288417 A1 | 12/2006 | Bookbinder et al. |
| 2007/0006227 A1 | 1/2007 | Kinney et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0180454 A1 | 8/2007 | Fujimoto et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0266389 A1* | 11/2007 | Ganguly ............ G06F 9/45558 718/104 |
| 2007/0271446 A1 | 11/2007 | Nakamura |
| 2007/0300227 A1 | 12/2007 | Mall et al. |
| 2008/0005782 A1 | 1/2008 | Aziz |
| 2008/0018122 A1 | 1/2008 | Zierler et al. |
| 2008/0028124 A1 | 1/2008 | Tago |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0059556 A1* | 3/2008 | Greenspan ........ G06F 9/45558 709/201 |
| 2008/0065854 A1 | 3/2008 | Schoenberg et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0244206 A1 | 10/2008 | Heo et al. |
| 2008/0263665 A1 | 10/2008 | Ma et al. |
| 2008/0294808 A1 | 11/2008 | Mahalingam et al. |
| 2008/0295172 A1 | 11/2008 | Bohacek |
| 2008/0301810 A1 | 12/2008 | Lehane et al. |
| 2008/0307188 A1* | 12/2008 | Franaszek ............ G06F 12/08 711/171 |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013149 A1 | 1/2009 | Uhlig et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Proves et al. |
| 2009/0106754 A1 | 4/2009 | Liu et al. |
| 2009/0113110 A1 | 4/2009 | Chen et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144510 A1 | 6/2009 | Wibling et al. |
| 2009/0144823 A1 | 6/2009 | Lamastra et al. |
| 2009/0158430 A1 | 6/2009 | Borders |
| 2009/0172661 A1 | 7/2009 | Zimmer et al. |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0307689 A1 | 12/2009 | Sudhakar |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0023810 A1 | 1/2010 | Stolfo et al. |

(56) References Cited

U.S. PATENT DOCUMENTS

| | | |
|---|---|---|
| 2010/0030996 A1 | 2/2010 | Butler, II |
| 2010/0031353 A1 | 2/2010 | Thomas et al. |
| 2010/0031360 A1 | 2/2010 | Seshadri et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0229173 A1 | 9/2010 | Subrahmanyam et al. |
| 2010/0235831 A1 | 9/2010 | Dittmer |
| 2010/0251104 A1 | 9/2010 | Massand |
| 2010/0254622 A1 | 10/2010 | Kamay et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299665 A1 | 11/2010 | Adams |
| 2010/0299754 A1 | 11/2010 | Amit et al. |
| 2010/0306173 A1 | 12/2010 | Frank |
| 2011/0004737 A1 | 1/2011 | Greenebaum |
| 2011/0004935 A1 | 1/2011 | Moffie et al. |
| 2011/0025504 A1 | 2/2011 | Lyon et al. |
| 2011/0041179 A1 | 2/2011 | St hlberg |
| 2011/0047542 A1 | 2/2011 | Dang et al. |
| 2011/0047544 A1 | 2/2011 | Yehuda et al. |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0153909 A1 | 6/2011 | Dong |
| 2011/0161955 A1 | 6/2011 | Woller et al. |
| 2011/0167422 A1 | 7/2011 | Eom et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0179417 A1 | 7/2011 | Inakoshi |
| 2011/0197003 A1 | 8/2011 | Serebrin et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0296412 A1 | 12/2011 | Banga et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0320556 A1 | 12/2011 | Reuther |
| 2011/0320682 A1* | 12/2011 | Mcdougall ............. G06F 12/023 711/6 |
| 2012/0023593 A1 | 1/2012 | Puder et al. |
| 2012/0047580 A1 | 2/2012 | Smith et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084517 A1 | 4/2012 | Post et al. |
| 2012/0084859 A1 | 4/2012 | Radinsky et al. |
| 2012/0093160 A1 | 4/2012 | Tonsing et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0144156 A1* | 6/2012 | Matsuda ............. G06F 11/0778 712/29 |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0254995 A1 | 10/2012 | Sallam |
| 2012/0255002 A1 | 10/2012 | Sallam |
| 2012/0255015 A1 | 10/2012 | Sahita et al. |
| 2012/0255016 A1 | 10/2012 | Sallam |
| 2012/0255017 A1 | 10/2012 | Sallam |
| 2012/0255021 A1 | 10/2012 | Sallam |
| 2012/0260342 A1 | 10/2012 | Dube et al. |
| 2012/0266244 A1 | 10/2012 | Green et al. |
| 2012/0272241 A1 | 10/2012 | Nonaka et al. |
| 2012/0278886 A1 | 11/2012 | Luna |
| 2012/0297489 A1 | 11/2012 | Dequevy |
| 2012/0311708 A1 | 12/2012 | Agarwal et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0031374 A1 | 1/2013 | Thom et al. |
| 2013/0036472 A1 | 2/2013 | Aziz |
| 2013/0047257 A1 | 2/2013 | Aziz |
| 2013/0055256 A1 | 2/2013 | Banga et al. |
| 2013/0074185 A1 | 3/2013 | McDougal et al. |
| 2013/0086684 A1 | 4/2013 | Mohler |
| 2013/0097699 A1 | 4/2013 | Balupar et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0125115 A1 | 5/2013 | Tsirkin et al. |
| 2013/0139264 A1 | 5/2013 | Brinkley et al. |
| 2013/0145055 A1 | 6/2013 | Kegel et al. |
| 2013/0145471 A1 | 6/2013 | Richard et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174147 A1 | 7/2013 | Sahita et al. |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191824 A1 | 7/2013 | Muff et al. |
| 2013/0191915 A1 | 7/2013 | Antonakakis et al. |
| 2013/0191924 A1 | 7/2013 | Tedesco et al. |
| 2013/0196649 A1 | 8/2013 | Paddon et al. |
| 2013/0227680 A1 | 8/2013 | Pavlyushchik |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0282776 A1 | 10/2013 | Durrant et al. |
| 2013/0283370 A1 | 10/2013 | Vipat et al. |
| 2013/0291109 A1 | 10/2013 | Staniford et al. |
| 2013/0298243 A1 | 11/2013 | Kumar et al. |
| 2013/0305006 A1 | 11/2013 | Altman et al. |
| 2013/0312099 A1 | 11/2013 | Edwards et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0332926 A1 | 12/2013 | Jakoljevic et al. |
| 2013/0333033 A1 | 12/2013 | Khesin |

(56) References Cited

U.S. PATENT DOCUMENTS

| | | |
|---|---|---|
| 2013/0346966 A1 | 12/2013 | Natu et al. |
| 2013/0347131 A1 | 12/2013 | Mooring et al. |
| 2014/0032875 A1 | 1/2014 | Butler |
| 2014/0053226 A1* | 2/2014 | Fadida .............. H04L 67/34 726/1 |
| 2014/0053260 A1 | 2/2014 | Gupta et al. |
| 2014/0053261 A1 | 2/2014 | Gupta et al. |
| 2014/0115652 A1 | 4/2014 | Kapoor et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0281560 A1 | 9/2014 | Ignatchenko et al. |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351810 A1 | 11/2014 | Pratt et al. |
| 2014/0351935 A1 | 11/2014 | Shao et al. |
| 2014/0380009 A1 | 12/2014 | Lemay et al. |
| 2014/0380308 A1 | 12/2014 | Hassine et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0085665 A1 | 3/2015 | Kompella et al. |
| 2015/0096007 A1* | 4/2015 | Sengupta ............ H04L 63/0218 726/11 |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0178110 A1* | 6/2015 | Li ...................... G06F 9/45558 718/1 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199514 A1 | 7/2015 | Tosa et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0242227 A1 | 8/2015 | Nair |
| 2015/0269004 A1 | 9/2015 | Gainey, Jr. et al. |
| 2015/0336005 A1* | 11/2015 | Melnick ................ A63F 13/73 463/29 |
| 2015/0355919 A1 | 12/2015 | Gatherer et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0048464 A1 | 2/2016 | Nakajima et al. |
| 2016/0055017 A1 | 2/2016 | Beveridge et al. |
| 2016/0110291 A1 | 4/2016 | Gordon et al. |
| 2016/0117190 A1 | 4/2016 | Sankaran et al. |
| 2016/0117498 A1* | 4/2016 | Saxena ................ G06F 21/74 726/23 |
| 2016/0127393 A1 | 5/2016 | Aziz et al. |
| 2016/0132351 A1 | 5/2016 | Kashyap et al. |
| 2016/0147993 A1 | 5/2016 | Xu et al. |
| 2016/0191547 A1 | 6/2016 | Zafar et al. |
| 2016/0191550 A1 | 6/2016 | Ismael et al. |
| 2016/0246730 A1 | 8/2016 | Gandhi et al. |
| 2016/0261612 A1 | 9/2016 | Mesdaq et al. |
| 2016/0285914 A1 | 9/2016 | Singh et al. |
| 2016/0299851 A1 | 10/2016 | Mattson, Jr. et al. |
| 2016/0301703 A1 | 10/2016 | Aziz |
| 2016/0306749 A1 | 10/2016 | Tsirkin et al. |
| 2016/0335110 A1 | 11/2016 | Paithane et al. |
| 2016/0337437 A1* | 11/2016 | Gartsbein ............... H04L 67/06 |
| 2016/0366130 A1 | 12/2016 | Jung |
| 2017/0083703 A1 | 3/2017 | Abbasi et al. |
| 2017/0090966 A1* | 3/2017 | Gupta ................ G06F 9/45558 |
| 2017/0262306 A1 | 9/2017 | Wang et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0276038 A1 | 9/2018 | Malik et al. |
| 2018/0288077 A1 | 10/2018 | Siddiqui et al. |
| 2018/0357093 A1 | 12/2018 | Cong et al. |

FOREIGN PATENT DOCUMENTS

| | | |
|---|---|---|
| KR | 101678607 B1 | 11/2016 |
| WO | 02/006928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/135192 A2 | 10/2012 |
| WO | 2012/145066 A1 | 10/2012 |
| WO | 2012/154664 A2 | 11/2012 |
| WO | 2012/177464 A1 | 12/2012 |
| WO | 2013/067505 A1 | 5/2013 |
| WO | 2013091221 A1 | 6/2013 |
| WO | 2014/004747 A2 | 1/2014 |

OTHER PUBLICATIONS

Singh, S. , et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham , "Insertion, Evasion, and Denial of Service: Eluding Network Intrusion Detection", Secure Networks, ("Ptacek"), (Jan. 1998).

U.S. Appl. No. 15/230,215, filed Aug. 5, 2016 Non-Final Office Action dated Oct. 5, 2018.

U.S. Appl. No. 15/230,215, filed Aug. 5, 2016 Notice of Allowance dated Feb. 6, 2019.

U.S. Appl. No. 15/237,377, filed Aug. 15, 2016 Advisory Action dated Oct. 19, 2018.

U.S. Appl. No. 15/237,377, filed Aug. 15, 2016 Final Rejection dated Jul. 10, 2018.

U.S. Appl. No. 15/237,377, filed Aug. 15, 2016 Non-Final Rejection dated Feb. 6, 2019.

U.S. Appl. No. 15/237,377, filed Aug. 15, 2016 Non-Final Rejection dated Jan. 18, 2018.

U.S. Appl. No. 15/257,704, filed Sep. 6, 2016 Non-Final Office Action dated Mar. 12, 2018.

U.S. Appl. No. 15/257,704, filed Sep. 6, 2016 Notice of Allowance dated Sep. 19, 2018.

U.S. Appl. No. 15/199,871, filed Jun. 30, 2016.

U.S. Appl. No. 15/199,873, filed Jun. 30, 2016.

U.S. Appl. No. 15/199,876, filed Jun. 30, 2016.

U.S. Appl. No. 15/199,882, filed Jun. 30, 2016.

Venezia, Paul , "NetDetector Captures Intrusions", InfoWorld Issue 27, ("Venezia"), (Jul. 14, 2003).

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wafaa, Andrew13 "Introducing the 64-bit ARMv8 Architecture" Open Source Arm Ltd. EuroBSDCon conference, Malta, Sep. 28-29, 2013, 20 pages.

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

(56) References Cited

OTHER PUBLICATIONS

Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al.: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Bromium vSentry—Defeat the Unknown Attack," Oct. 10, 2013, 11 pages.
Amiri Sani, Ardalan, et al. "I/O paravirtualization at the device file boundary." ACM SIGPLAN Notices 49.4 (2014), pp. 319-332.
Bromium Corp, "Bromium vSentry, Defeat of the Unknown Attack," downloaded from http://www.bromium.com/sites/default/files/Bromium-Whitepaper-vSentr-y_2.pdf on Dec. 1, 2013.
Bromium Corp, "Live Attack Visualization and Analysis, What does a Malware attack look like?" http://www.bromium.com/sites/default/files/Bromium%2OLAVA%20WP_2.pdf on Dec. 1, 2013.
Chen, Peter M., and Brian D. Noble. "When virtual is better than real [operating system relocation to virtual machines]." Hot Topics in Operating Systems, 2001. Proceedings of the Eighth Workshop on. IEEE, 2001.
Gao, Debin, Michael K. Reiter, and Dawn Xiaodong Song. "On Gray-Box Program Tracking for Anomaly Detection." USENIX security symposium. 2004.
Garfinkel, Tal, and Mendel Rosenblum. "A Virtual Machine Introspection Based Architecture for Intrusion Detection." NDSS. 2003.
Heiser, Gemot, and Ben Leslie "The OKL4 Microvisor: Convergence point of microkernels and hypervisors." Proceedings of the first ACM asia-pacific workshop on Workshop on systems. ACM, 2010.
Hewlett Packard et al, "Advanced Configuration and Power Interface Specification," pp. 31-54, and 607-624, Nov. 13, 2013.
Hofmeyr, Steven A., Stephanie Forrest, and Anil Somayaji. "Intrusion detection using sequences of system calls." Journal of computer security 6.3 (1998): 151-180.
Huang, Yih, et al. "Efficiently tracking application interactions using lightweight virtualization." Proceedings of the 1st ACM workshop on Virtual machine security. ACM, 2008.
Iqbal, Asif, Nayeema Sadeque, and Rafika Ida Mutia. "An overview of microkernel, hypervisor and microvisor virtualization approaches for embedded systems." Report, Department of Electrical and Information Technology, Lund University, Sweden 2110 (2009), 15 Pages.
Iqbal, et al.,—"An Overview of Microkernel, Hypervisor and Microvisor Virtualization Approaches for Embedded Systems," Department of Electrical and Information Technology, Lund University, Sweden, Aug. 26, 2013, 15 pages.
Jiang, Xuxian, Xinyuan Wang, and Dongyan Xu. "Stealthy malware detection through vmm-based out-of-the-box semantic view reconstruction." Proceedings of the 14th ACM conference on Computerand communications security. ACM, 2007.
Jones, Stephen T., Andrea C. Arpaci-Dusseau, and Remzi H. Arpaci-Dusseau. "Antfarm: Tracking Processes in a Virtual Machine Environment" USENIX Annual Technical Conference, General Track 2006.
Kapravelos, Alexandros, et al. "Revolver: An Automated Approach to the Detection of Evasive Web-based Malware." USENIX Security Symposium. 2013.
King, Samuel T., and Peter M. Chen. "SubVirt: Implementing malware with virtual machines." Security and Privacy, 2006 IEEE Symposium on. IEEE, 2006, 14 Pages.
Kosoresow, Andrew P., and Steven A. Hofmeyr. "Intrusion detection via system call traces." IEEE software 14.5 (1997): 35-42.
Laureano, Marcos, Carlos Maziero, and Edgard Jamhour. "Intrusion detection in virtual machine environments." Euromicro Conference, 2004 Proceedings 30th. IEEE, 2004.
Levin, Thomas E., Cynthia E. Irvine, and Thuy D. Nguyen. Least privilege in separation kernels. Naval Postgraduate School Monterey CA Dept of Computer Science, 2006.
Nguyen, Anh M., et al. "Mavmm: Lightweight and purpose built vmm for malware analysis." Computer Security Applications Conference, 2009. ACSAC'09. Annual. IEEE, 2009.
PCT Notification of Transmittal of the International Search Report and the Written Opinion of the International Searching Authority, or the Declaration, International Searching Authority, International Application No. PCT/US2014/071847, dated Mar. 26, 2015, 16 pages.
PCT Notification of Transmittal of the International Search Report and the Written Opinion of the International Searching Authority, or the Declaration, International Searching Authority, International Application No. PCT/US2014/071879, dated Apr. 28, 2015, 12 pages.
PCT Notification of Transmittal of the International Search Report and the Written Opinion of the International Searching Authority, or the Declaration, International Searching Authority, International Application No. PCT/US2014/071923, dated Mar. 26, 2015, 13 pages.
Steinberg, Udo, and Bernhard Kauer. "NOVA: a microhypervisor-based secure virtualization architecture." Proceedings of the 5th European conference on Computer systems. ACM, 2010, 14 pages.
Stumpf, Frederic, et al. "An approach to a trustworthy system architecture using virtualization." Autonomic and trusted computing. Springer Berlin Heidelberg, 2007. 191-202.
Sun, Kun, et al. "SecureSwitch: BIOS-Assisted Isolation and Switch between Trusted and Untrusted Commodity OSes." George Mason Feb. 26, 2013, 15 pages.
U.S. Appl. No. 15/229,770, filed Aug. 5, 2016 Non-Final Office Action dated Nov. 2, 2017.
U.S. Appl. No. 15/229,770, filed Aug. 5, 2016 Notice of Allowance dated May 18, 2018.
Wojtczuk, Ratal. "Subverting the Xen hypervisor." Black Hat USA 2008 (2008), 9 pages.
Yan, Lok Kwong, et al. "Transparent and Extensible Malware Analysis by Combining Hardware Virtualization and Software Emulation." Internet Society, 2010. Downloaded from https://www.intemetsociety.org/sites/default/files/05_1.pdf.
U.S. Appl. No. 15/230,215, filed Aug. 5, 2016 Notice of Allowance dated Jun. 4, 2019.
U.S. Appl. No. 15/237,377, filed Aug. 15, 2016 Final Rejection dated Jul. 17, 2019.
"Mining Specification of Malicious Behavior"—Jha et al., UCSB, Sep. 2007 https://www.cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), p. 67-77.

(56) References Cited

OTHER PUBLICATIONS

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gerzon, Gideon—"Intel® Virtualization Technology Processor Virtualization Extensions and Intel® Trusted execution Technology." (2007), 53 pages.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al.: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al.: "Using Cloud Computing to Implement a Security Overlay Network", SECURITY & Privacy, IEEE, IEEE Service Center, Los Alamitos, CA, US, vol. 11, No. 1, Jan. 1, 2013 (Jan. 1, 2013).

Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kivity et al. "kvm: the Linux virtual machine monitor." Proceedings of the Linux symposium. vol. 1. 2007, 8 pages.
Kreibich, C., et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard fora NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Shah et al. "Hardware-assisted Virtualization," 15-612 Operating System Practicum Carnegie Mellon University, Sep. 8, 2013, 28 pages.
Hoffman et al, "Ensuring operating system kernel integrity," ASPLOS' 11, ACM, pp. 279-290 (Year: 2011).
Riley et al., "Guest-Transparent Prevention of Kernel Rootkits with VMM-Based Memory Shadowing." In: Lippmann R., Kirda E., Trachtenberg A. (eds) Recent Advances in Intrusion Detection. RAID 2008. Lecture Notes in Computer Science, vol. 5230. Springer, Berlin, Heidelberg (Year: 2008).
U.S. Appl. No. 15/237,377, filed Aug. 15, 2016 Non-Final Rejection dated Mar. 3, 2020.
Zhang et al., "Performance analysis towards a KVM-Based embedded real-time virtualization architecture," 5th International Conference on Computer Sciences and Convergence Information Technology, Seoul, 2010, pp. 421-426. (Year: 2010).
U.S. Appl. No. 15/237,377, filed Aug. 15, 2016 Notice of Allowance dated Jul. 8, 2020.

* cited by examiner

LATE LOAD TECHNIQUE FOR DEPLOYING A VIRTUALIZATION LAYER UNDERNEATH A RUNNING OPERATING SYSTEM

RELATED APPLICATION

The present application is a continuation of U.S. patent application Ser. No. 15/229,770, filed Aug. 5, 2016, now U.S. Pat. No. 10,108,446, issued Oct. 23, 2018, which claims priority from commonly owned Provisional Patent Application No. 62/266,129, entitled LATE LOAD TECHNIQUE FOR DEPLOYING A VIRTUALIZATION LAYER UNDERNEATH A RUNNING OPERATING SYSTEM, filed on Dec. 11, 2015, the contents of which are incorporated herein by reference.

BACKGROUND

Technical Field

The present disclosure relates to virtualization systems having virtualization layers and, more specifically, to deployment of a virtualization layer underneath an operating system.

Background Information

Data communication in a network involves the exchange of data between two or more entities interconnected by communication links and sub-networks (segments). The entities are typically software processes executing in operating systems of computers, such as endpoint nodes (endpoints) and intermediate nodes. The intermediate nodes interconnect the communication links and segments to enable transmission of data between the endpoints. A local area network (LAN) is an example of segment that provides relatively short distance communication among the interconnected nodes, whereas a wide area network (WAN) enables long distance communication over links provided by telecommunications facilities. The Internet is an example of a WAN that connects disparate computer networks throughout the world, providing global communication between nodes on various networks.

Malicious software (malware) has become a pervasive problem for nodes coupled to networks, such as the Internet. Malware is often embedded within downloadable content intended to adversely influence or attack normal operations of a node. Whereas operating system vulnerabilities have traditionally been common targets of such malware content, attackers have broadened their attack to exploit vulnerabilities in processes or applications, such as web browsers. For example, malware content may be embedded within objects associated with a web page hosted by a malicious web site.

Various types of security enhanced nodes are often deployed at different segments of the networks. These nodes often employ virtualization systems having virtualization layers to provide enhanced security needed to uncover the presence of malware embedded within ingress content propagating over the different segments. Often, the virtualization system is created by loading the virtualization layer on native hardware of the node, such as an endpoint, prior to loading of an operating system within a virtual machine of the node. However, such a configuration usually requires installing the operating system on the virtual machine that is already configured for the native hardware. Often the operating system is previously installed and running on the native hardware such that it is desirable to deploy (i.e., "slip") the virtualization layer underneath the previously installed operating system (e.g., while the operating system is running on the native hardware) and, thereafter during runtime, move the operating system from the native hardware to a virtual machine on the node. In this manner, the benefits of enhanced security from virtualization may be obtained without disturbing any existing operating system configuration, such as software applications and device drivers.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
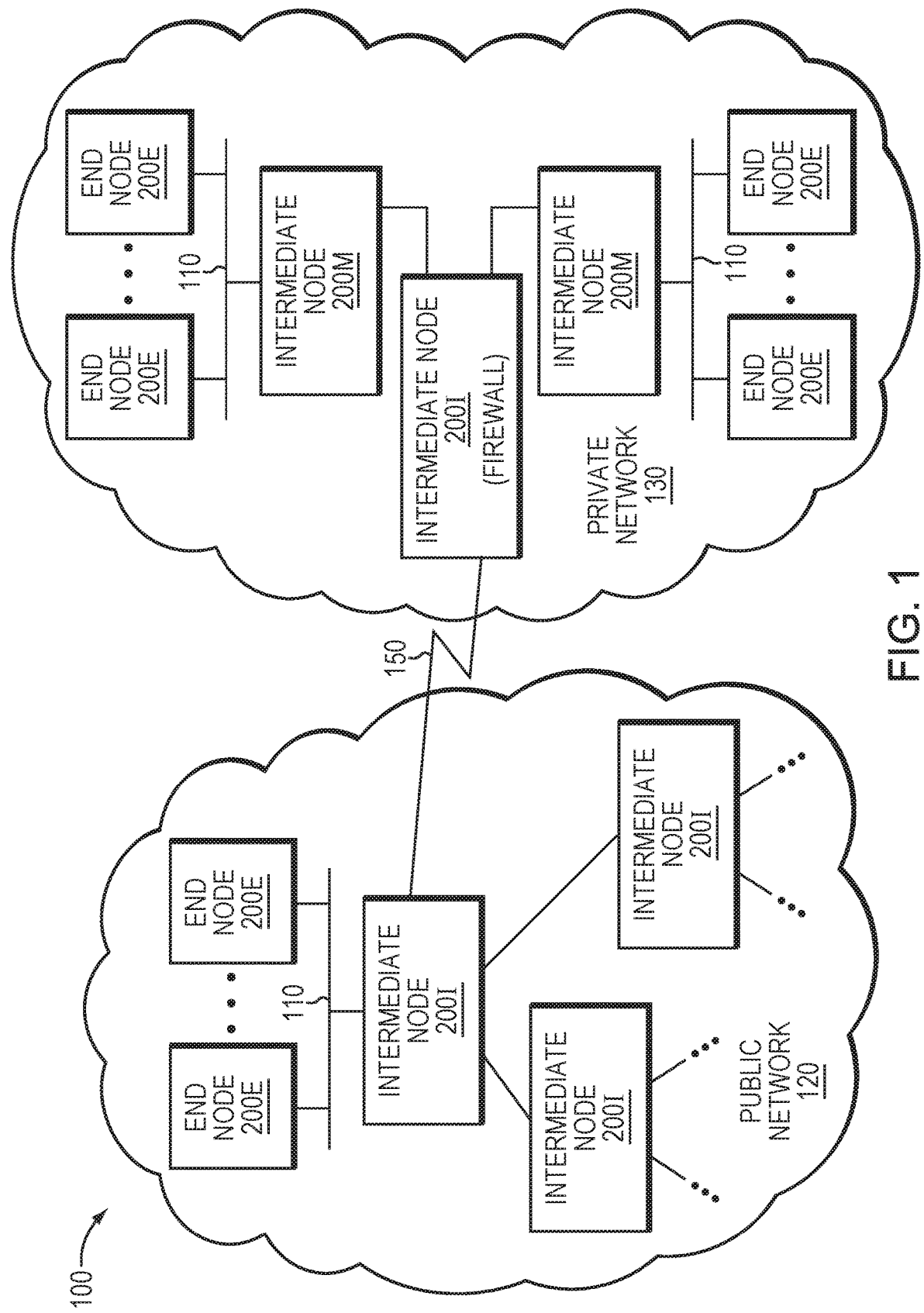
FIG. 1 is a block diagram of a network environment that may be advantageously used with one or more embodiments described herein.

The embodiments described herein provide a late load technique for deploying a virtualization layer underneath an operating system executing on a node of a network environment to enable the virtualization layer to enhance security of the operating system. To deploy the underlying virtualization layer, a ring 0 driver (e.g., a kernel module or kernel mode driver) having a highest privilege level of the operating system (hereinafter "guest operating system") is loaded in a memory of the node. Binary executable files (binaries) for the virtualization layer may be included in the ring 0 driver (i.e., binaries executed in the virtualization layer and not executed in the ring 0 driver). Once loaded, the ring 0 driver may request allocation of physical memory from the guest operating system for the virtualization layer. Upon acquiring the physical memory, the ring 0 driver may place the guest operating system (O/S) into a quiescent state and take control of hardware resources, such as one or more central processing units (CPUs) and devices (including security-critical devices), of the node. Specifically, the ring 0 driver may halt the hardware resources in a deterministic manner, and capture and save one or more architectural states (e.g., contents of registers) of the resources, which may be used to create a virtual machine having an initial state that is substantially identical to the states of the guest operating system and hardware resources executing on the node prior to deployment of the underlying virtualization layer.

In an embodiment, the late load technique may leverage a suspend function of the guest O/S to quiesce the node by, e.g., halting all activity of the resources, saving the states of the resources, bootstrapping the virtualization layer directly on the node (i.e., underneath the running guest O/S) and, thereafter, restoring the saved states of those resources while running in a virtual machine, so that the guest O/S is transparently reconstituted (i.e., without reboot to reconfigure the operating system state changes) in that virtual machine. That is, the suspend function of the guest O/S may be used to capture and save the states of the hardware resources, which thereafter may be restored as the state of the virtual machine created by the ring 0 driver. Illustratively, the suspend function may be modified so as to return control to the ring 0 driver after quiescing the guest operating system.

Upon quiescing the guest O/S and most of the hardware resources, the ring 0 driver may load the binaries of the virtualization layer into the acquired memory and bootstrap (activate) the virtualization layer to create the virtual machine having the captured state and associated hyperprocesses, e.g., a guest monitor. The virtualization layer may then create a memory map where memory available to the virtual machine (e.g., guest-physical memory) is mapped to memory controlled by the virtualization layer (e.g., host-physical memory) excluding the physical memory allocated for the virtualization layer to thereby hide and protect the virtualization layer from the guest operating system. In an embodiment, the memory allocated to the virtualization layer by the guest O/S is pinned kernel mode memory dedicated to a pseudo device controlled by the ring 0 driver, so that effectively the memory is no longer managed (e.g., accessed) by the guest O/S.

Thereafter, the virtualization layer may initialize the hardware resources with a configuration specified by the virtualization layer and create virtual devices (such as virtual CPUs and virtual interrupt controllers) for those resources initialized with the captured states of the resources prior to activation of the virtualization layer (i.e., at a time of quiescing the guest O/S). The virtualization layer may then bootstrap the virtual machine, e.g., VM. The virtualization layer may pass any remaining resources (devices) directly through to the guest operating system and restart the virtual CPUs in the VM with their captured states. Accordingly, the guest O/S is reconstituted in the virtual machine to have a same state as when running directly on the node, because the pass-through devices retain their states and the virtual devices (e.g., virtual CPU) have an initial state identical to that of their physical counterparts (e.g., physical CPU) prior to activation of the virtualization layer. As a result, the virtualization layer is deployed underneath the guest operating system of the virtual machine and configured to control the hardware resources, thereby permitting enhanced security of the node.

DESCRIPTION

FIG. 1 is a block diagram of a network environment 100 that may be advantageously used with one or more embodiments described herein. The network environment 100 illustratively includes a plurality of computer networks organized as a public network 120, such as the Internet, and a private network 130, such an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes $200_I$ to form an internetwork of nodes, wherein the intermediate nodes $200_I$ may include network switches, routers and/or one or more malware detection system (MDS) appliances (intermediate node $200_M$). As used herein, an appliance may be embodied as any type of general-purpose or special-purpose computer, including a dedicated computing device, adapted to implement a variety of software architectures relating to exploit and malware detection functionality. The term "appliance" should therefore be taken broadly to include such arrangements, in addition to any systems or subsystems configured to perform a management function for exploit and malware detection, and associated with other equipment or systems, such as a network computing device interconnecting the WANs and LANs. The LANs 110 may, in turn, interconnect end nodes $200_E$ which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., network traffic) according to a predefined set of protocols, such as the Transmission Control Protocol/Internet Protocol (TCP/IP); however, it should be noted that additional protocols, such as the HyperText Transfer Protocol Secure (HTTPS), may be advantageously used with the embodiments herein. In the case of private network 130, the intermediate node $200_I$ may include a firewall or other network device configured to limit or block certain network traffic in an attempt to protect the endpoints from unauthorized users. Unfortunately, such conventional attempts often fail to protect the endpoints, which may be compromised.

Figure 2:
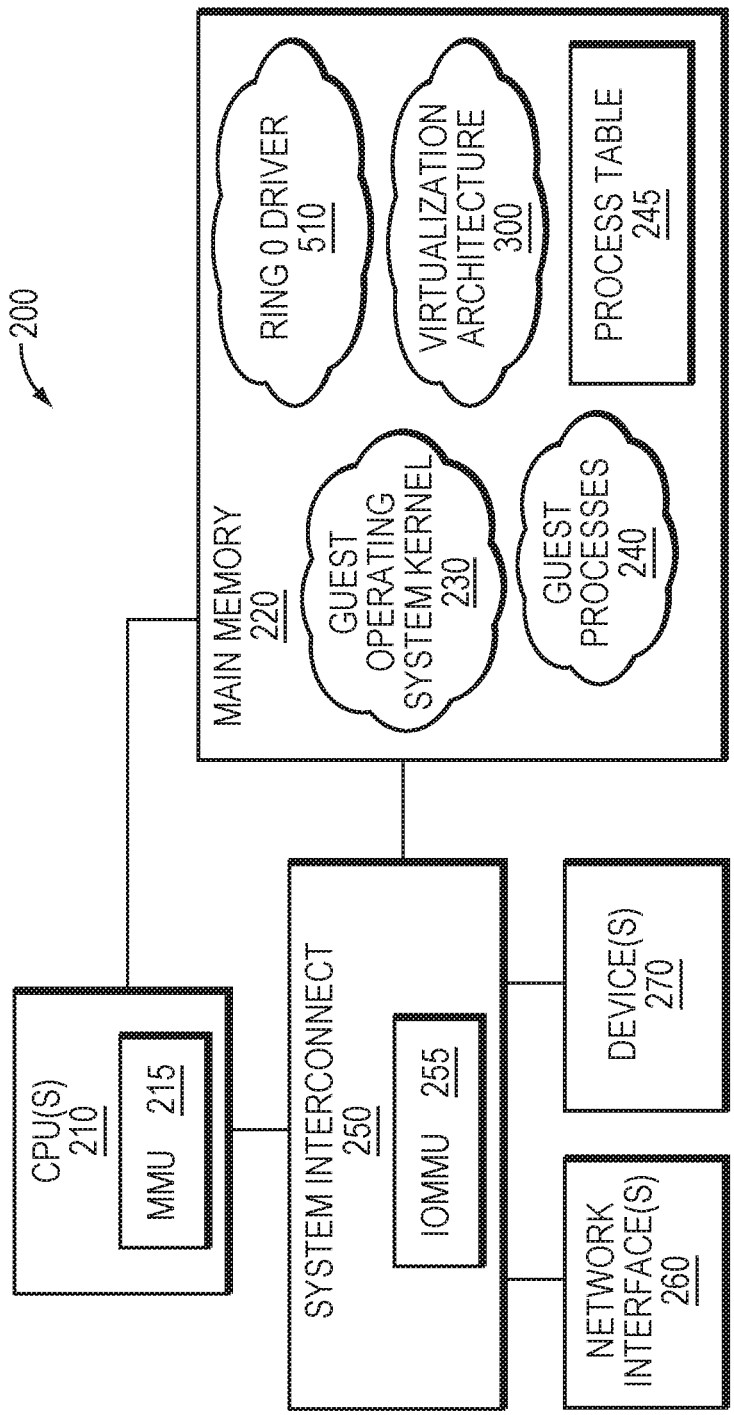
FIG. 2 is a block diagram of a node that may be advantageously used with one or more embodiments described herein.

FIG. 2 is a block diagram of a node 200, e.g., end node $200_E$ that may be advantageously used with one or more embodiments described herein. The node 200 illustratively includes one or more central processing unit (CPUs) 210 each having one or more CPU cores (not shown), a main memory 220, one or more network interfaces 260 and one or more devices 270 connected by a system interconnect 250. The devices 270 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 260 may include one or more network ports containing the mechanical, electrical and/or signaling circuitry needed to connect the node to the network 130 to thereby facilitate communication over the network. To that end, the network interface 260 may be configured to transmit and/or receive messages using a variety of communication protocols including, inter alia, TCP/IP and HTTPS.

The memory 220 may include a plurality of locations that are addressable by the CPU(s) 210 via a memory management unit (MMU 215), as well as the network interface(s) 260 and device(s) 270 via an I/O MMU (IOMMU 255). Note that accesses to/from memory 220 by the CPU(s) 210 may occur directly through the MMU 215 without passing through the system interconnect 250, whereas accesses to/from the memory by the network interface(s) 260 and device(s) 270 may occur directly through the IOMMU 255 of the system interconnect. That is, a first data path may occur directly from the CPU to the memory 220 and a second (independent) data path may occur directly from the I/O devices 270 to the memory 220 via the system interconnect 270. The memory locations may be configured to store software program code (e.g., an operating system and application programs) and data structures associated with the embodiments described herein. The CPU 210 may include processing elements or logic adapted to execute the software program code, such as a ring 0 driver 510 and one or more modules of a virtualization architecture 300, and manipulate the data structures, such as a process table 245. Exemplary CPUs may include families of instruction set architectures based on the x86 CPU from Intel Corporation of Santa Clara, Calif., the x64 CPU from Advanced Micro Devices of Sunnyvale, Calif., and the ARM CPU from ARM Holdings, plc of the United Kingdom.

A (guest) operating system kernel 230, portions of which are typically resident in memory 220 and executed by the CPU, functionally organizes the node by, inter alia, invoking operations in support of the software program code and application programs executing on the node. A suitable guest operating system kernel 230 may include the Windows® series of operating systems from Microsoft Corp of Redmond, Wash., the MAC OS® and IOS® series of operating systems from Apple Inc. of Cupertino, Calif., the Linux operating system and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the software program code may be executed as guest processes 240 of the kernel 230. As used herein, a process (e.g., a guest process) is an instance of software program code (e.g., an application program) executing in the operating system that may be separated (decomposed) into one or more threads, wherein each thread is a sequence of execution within the process.

Figure 3:
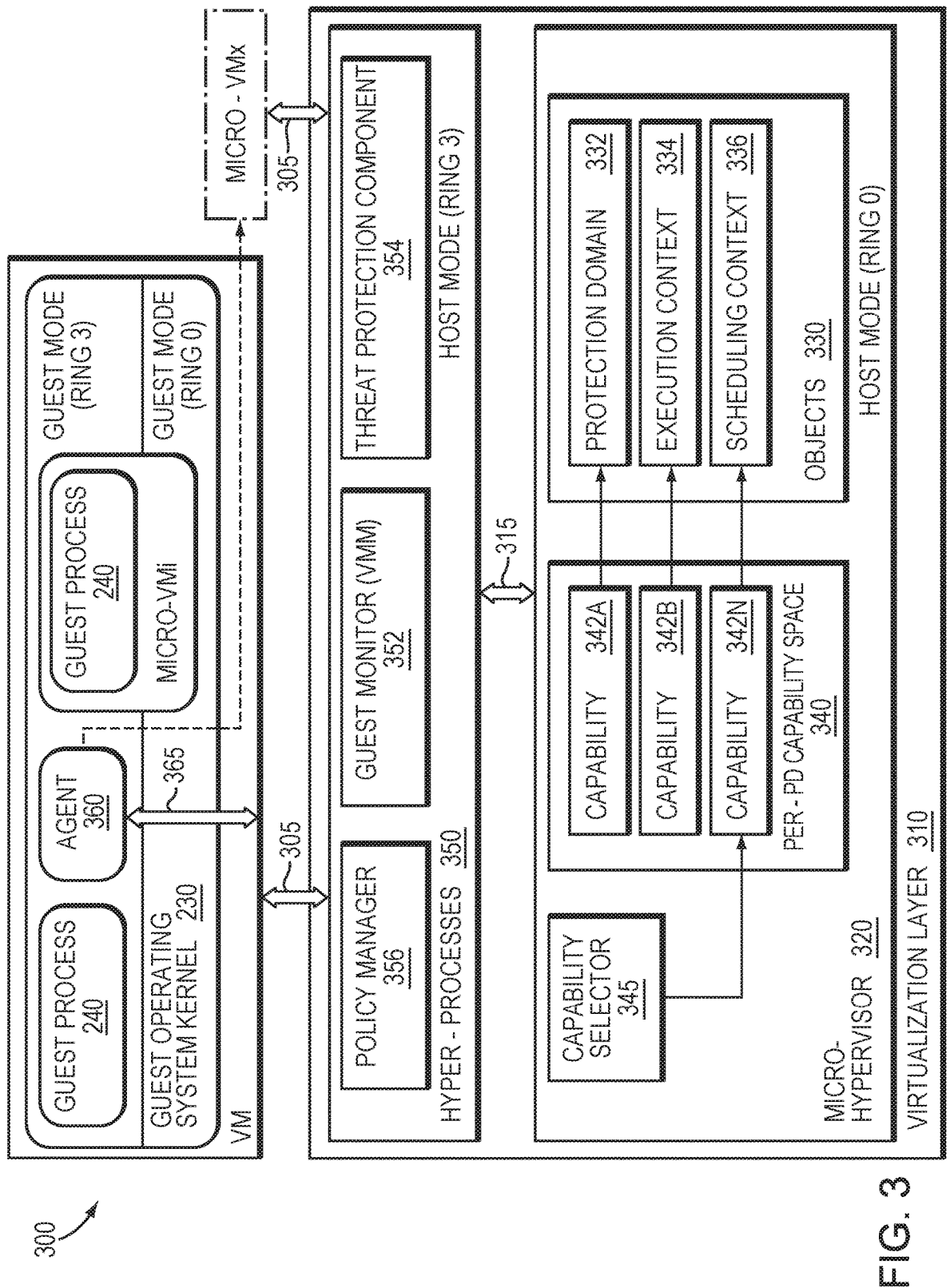
FIG. 3 is a block diagram of a virtualization architecture including a virtualization layer that may be advantageously used with one or more embodiments described herein.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer applications or programs stored in memory, alternative embodiments may also include the code, processes and programs being embodied as components, logic, and/or modules consisting of hardware, software, firmware, or combinations thereof Virtualization Architecture FIG. 3 is a block diagram of a virtualization architecture 300 including a virtualization layer 310 that may be advantageously used with one or more embodiments described herein. The virtualization architecture 300 described herein is illustratively deployed in node 200 embodied as endpoint $200_E$. The virtualization architecture 300 illustratively includes two privilege modes: guest mode and host mode. In an embodiment, a guest operating system (O/S) runs in the guest mode within a virtual machine, e.g., VM. The guest mode may employ a first set of four protection rings, e.g., guest mode rings 0-3, wherein one or more guest applications (guest processes 240) run in guest mode ring 3 at a lowest guest mode privilege level, and the guest operating system (guest operating system kernel 230) runs in guest mode ring 0 at a highest guest mode privilege level. The virtualization layer 310 operates in host mode of the virtualization architecture, which includes a second set of four protection rings, e.g., host mode rings 0-3. Illustratively, various user mode components embodied as hyper-processes 350 of the virtualization layer 310 run in host mode ring 3 at a lowest host mode privilege level, and a kernel portion (i.e., micro-hypervisor 320) of the virtualization layer runs in host mode ring 0 at a highest host mode privilege level.

The micro-hypervisor 320 (i.e., a type of hypervisor operating at a highest privilege level of a physical processor of the node) may be embodied as a light-weight module configured to facilitate run-time security analysis, including exploit and malware detection and threat intelligence, of the guest processes 240 executing on the node 200. As described herein, the micro-hypervisor 320 may cooperate with corresponding hyper-processes 350 of the virtualization layer 310 to virtualize the hardware and control privileges (i.e., access control permissions) to hardware resources of the node that are typically controlled by the guest operating system kernel. Illustratively, the hardware resources may include (physical) CPU(s) 210, memory 220, network interface(s) 260, and devices 270. The micro-hypervisor 320 may be configured to control access to one or more of the resources in response to a request by a guest process 240 to access the resource.

A user mode portion of the virtualization layer 310 includes the hyper-processes 350, examples of which include, inter alia, a guest monitor 352, a threat protection component 354, and a policy manager 356. The guest monitor 352 is illustratively a unique virtual machine monitor (VMM), i.e., a type 0 VMM, which includes virtualization functionality that cooperates with the micro-hypervisor 320 to virtualize the guest operating system within the VM and run one or more micro-virtual machines (micro-VMs), such as, in some embodiments, a memory view. Accordingly, the guest monitor 352 may include computer executable instructions executed by the CPU 210 to perform operations that spawn, configure, and control/implement the VM or any of a plurality of micro-VMs. The guest monitor 352 may further include virtualization functionality that emulates privileged instructions (i.e., an instruction emulator) and devices (i.e., a virtual device emulator) that act as software substitutes for hardware devices not directly assigned to the guest operating system. As such, a set of hardware resources may be virtualized among a plurality of micro-VMs that may access those resources. That is, the guest monitor 352 may create virtual devices (e.g., software state machines) of the hardware resources for use by the micro-VMs that, from the perspective of the guest operating system, appear as physical resources.

As used herein, the term "micro" VM denotes a virtual machine serving as a container that may be restricted to a single guest process (as opposed to the VM which is spawned as a container for the entire guest operating system having many guest processes). In one embodiment, the micro-VMx may be implemented outside of the VM, (i.e., in a separate protection domain) using, e.g., copy-on-write semantics. In another embodiment, the micro-VMi may be implemented inside the VM (i.e., inside a same protection domain as the VM) using, e.g., one or more memory views. However, whereas a micro-VM may be restricted to a single guest process, the hardware resources used by that micro-VM, such as memory, may be accessed by a plurality of micro-VMs (and their respective guest processes). As noted, there is only one virtual machine (e.g., the VM) per guest operating system on the endpoint. Typically, the guest operating system running in the VM has one "view" of the memory 220, i.e., "guest-physical" memory, corresponding to one nested page table. Accordingly, a same nested page table (i.e., memory view) may be used by a plurality of guest processes, each contained in a separate corresponding micro-VM that uses the same nested page table. However, additional views of memory may be created for each guest process, such as where every view corresponds to a different (i.e., separate) nested page table. Thus, different guest processes may view the guest-physical memory differently (e.g., with different translations or different permissions to the host-physical memory).

In an embodiment, the micro-VM may be implemented as such a view (i.e., a guest-physical memory view) of the memory 220, i.e., controlling the host-physical memory (hardware resource) underlying the guest-physical view of memory. Notably, different guest processes 240 may run in different micro-VMs, each of which is controlled by the (same) guest monitor 352 (also controlling the VM) to thereby enable a global view of execution activity in the guest operating system. The micro-VM thus has properties similar to the typical VM, but with less overhead, i.e., no additional guest monitors. In terms of execution, operation of the guest process is controlled and synchronized by the guest operating system kernel 230; however, in terms of access to hardware resources (managed in host mode), operation of the process is controlled by the guest monitor 352. Access to hardware resources may be synchronized among the micro-VMs and the VM by the guest monitor 352 rather than virtually shared. Notably, certain types of hardware resources, such as memory, may not need express synchronization among micro-VMs. For example, each CPU core may have a single memory view (i.e., set of nested page tables) active at a time, so that express synchronization among memory views is unnecessary. As such, memory views may be assigned to multiple micro-VMs with implicit synchronization.

In an embodiment, the privileged interfaces 305 and 315 may be embodied as a set of defined hyper-calls, each of which is an operation that explicitly calls (explicit transition) into the micro-hypervisor. The hyper-calls may originate from one or more hyper-processes 350 of the virtualization layer 310 and are directed to the micro-hypervisor 320 over the privileged interface 315; alternatively, bi-directional communications may originate from a protected component (e.g., an agent) in the guest operating system directed to the micro-hypervisor (virtualization layer) over the privileged interface 305. A transition from the guest operating system to the virtualization layer 310 is called a VM exit. Such a transition may be implicit, e.g., an intercepted operation or page-protection violation, or explicit, such as a VMCALL instruction from guest mode to host mode. Further, as used herein, an inter-process communication (IPC) message between two hyper-processes requires two hyper-calls (i.e., one for each process) for bi-directional communication.

The policy manager 356 may contain computer executable instructions executed by the CPU 210 to perform operations that associate a protection policy with each guest process 240. The threat protection component 354 may include instrumentation logic implemented as heuristics configured to determine the presence of an exploit or malware in any suspicious guest operating system process (kernel or user mode). To that end, the threat protection component 354 may include software program code (e.g., executable machine code) in the form of instrumentation logic (including decision logic) configured to analyze one or more interception points originated by one or more guest processes 240 to invoke the services, e.g., accesses to the hardware resources, of the guest operating system kernel 230. Illustratively, the threat protection component 354 may contain computer executable instructions executed by the CPU 210 to perform operations that initialize and implement the instrumentation logic.

As used herein, an interception point is a point in an instruction stream where control passes to (e.g., is intercepted by) the virtualization layer 310, e.g., the micro-hypervisor 320. Illustratively, the micro-hypervisor can intercept execution inside the guest operating system at arbitrary points such as (i) inside any guest process, (ii) inside the guest operating system kernel, and/or (iii) on transitions between guest processes and the guest operating system kernel. Malicious behavior may then be analyzed by the virtualization layer (e.g., the threat protection component 354), wherein the behavior may occur anywhere in the guest operating system, including in any guest process or in the guest operating system kernel. The virtualization layer 310 may, thus, place interception points at appropriate instruction stream points, whether in a process or in the kernel.

The guest operating system kernel 230 may be configured to include an operating system (OS) specific extension or agent 360 adapted to communicate with the threat protection component 354. The agent 360 illustratively contains executable machine code in the form of logic configured to provide an interface to the threat protection component 354 that allows introspection (examination and/or interception) of contents of internal structures of the guest operating system kernel 230, as well as semantic context associated with such contents. Such virtual machine introspection (VMI) may involve examination of data structures of the guest operating system kernel 230 in a manner that obviates duplication of (i.e., without copying) those structures between the guest and host modes of the virtualization architecture. To that end, the agent 360 may run in host mode ring 3 or guest mode ring 0; however, in an embodiment described herein, the agent 360 illustratively runs in guest mode ring 3. Accordingly, the agent 360 may contain computer executable instructions executed by the CPU 210 to perform operations that implement communication with, and introspection by, the threat protection component 354. For example, identification (ID) of each guest process 240 running in the guest operating system may be obtained from process IDs stored in a data structure, e.g., the process table 245, of the guest operating system. Accordingly, instead of having to know a location and format of that data structure, the threat protection component 354 can instruct the agent to examine the process table 245 and provide the ID of the guest process 240. That is, the agent 360 operating in the guest mode may act on behalf callers (e.g., guest monitor 352) operating in the host mode to access data structures in the guest mode. Alternatively, the threat protection component may examine directly the memory used by the guest O/S (i.e., virtual machine introspection) to determine locations (and layout) of the process table 245 so as to determine the ID of the guest process 240. Illustratively, threat protection component 354 may communicate with the guest operating system kernel 230 (i.e., the agent 360) over a defined application programming interface (API) 365.

As a light-weight module, the micro-hypervisor 320 may provide a virtualization layer having less functionality than a typical hypervisor. Therefore, as used herein, the micro-hypervisor 320 is a module that is disposed or layered beneath (underlying, i.e., directly on native hardware and operating at a highest privilege level of that native hardware) the guest operating system kernel 230 and includes the functionality of a micro-kernel (e.g., protection domains, execution contexts, capabilities and scheduling), as well as a subset of the functionality of a hypervisor (e.g., management of virtual CPUs and their states, management of the MMU, IOMMU and other security-critical devices, as well as hyper-calls to implement a virtual machine monitor). Accordingly, the micro-hypervisor 320 may cooperate with the guest monitor 352 to provide additional virtualization functionality in an operationally and resource efficient manner. Unlike a type 1 or type 2 VMM (hypervisor), the guest monitor 352 is illustratively a type 0 VMM (VMM) that need not fully virtualize the hardware resources of the node 200, while supporting execution of one entire operating system/instance inside one virtual machine, i.e., the VM. Illustratively, the VMM may either: (i) fully virtualize all hardware resources, (ii) virtualize only a first group of security-critical devices (e.g., CPU, MMU, IOMMU and interrupt controllers among others) and pass-through a remaining second group of non-security-critical devices; or (iii) virtualize a first group of devices and pass-through a second group of devices that are each assigned to a different VM. The guest monitor 352 may thus instantiate the VM as a container for the guest processes 240, as well as the guest operating system kernel 230 and its hardware resources. Illustratively, the guest monitor 352 is a pass-through module configured to expose the hardware resources of the node (as controlled by micro-hypervisor) to the guest operating system kernel 230. Yet, virtualization processing in response to a VM exit (and a resulting transition of control flow from the guest operating system to the micro-hypervisor) may be performed by the guest monitor. To that end, the micro-hypervisor may enable communication between the guest operating system (i.e., the VM) and the guest monitor over privileged interfaces 305 and 315.

In an embodiment, the micro-hypervisor 320 may include a plurality of data structures, such as objects 330 and capabilities 342, configured to provide security and isolation features associated with the virtualization architecture 300. Illustratively, the objects 330 include one or more protection domains 332, execution contexts 334 and scheduling contexts 336. As used herein, a protection domain 332 is a kernel mode object that implements spatial isolation among the hyper-processes of the virtualization layer and includes a representation of a security privilege associated with each hyper-process 350 that is enforced by the micro-hypervisor 320. Illustratively, each hyper-process 350 in the virtualization layer 310 runs in a separate protection domain 332. An execution context 334 is illustratively a representation of a thread associated with the hyper-process 350 and, to that end, defines a state of the thread for execution on the CPU 210. In an embodiment, the execution context 334 may include inter alia (i) contents of CPU registers, (ii) pointers/values on a stack, (iii) a program counter, and/or (iv) allocation of memory via, e.g., memory pages. The execution context 334 is thus a static view of the state of thread and, therefore, its associated hyper-process 350. For the thread to execute on a CPU, its execution context is tightly linked to a scheduling context 336, which may be configured to provide information for scheduling the execution context 334 for execution on the CPU 210. Illustratively, the scheduling context information may include a priority and a quantum time for execution of its linked execution context on CPU 210.

The micro-hypervisor 320 also includes a per-protection domain (PD) capability space 340 that contains capabilities 342A-N, wherein each capability 342 is a pointer to an object 330 having associated permissions (i.e., privileges). Hyper-processes 350 of the virtualization layer 310 do not have the ability to work with the capabilities 342 directly, i.e., they cannot read the pointer or privileges directly and can only refer to those capabilities using a capability selector 345, e.g., an integral number. To invoke a specific capability, a hyper-process 350, such as the guest monitor 352, may issue a hyper-call request (e.g., over interface 315) to the micro-hypervisor 320, wherein the request includes an action (e.g., "send a message" or "delegate a capability") along with a corresponding capability selector, i.e., an index such as N, that identifies (names) the object 330 involved in the hyper-call. Illustratively, the capabilities 342 are used to name the object on which the hyper-call operates and, at the same time, convey the access permissions of the calling hyper-process on that object. In response to the request, the micro-hypervisor may access the per-PD capability space 340 to select the requested capability 342N, which names (e.g., points to) the object (e.g., scheduling context 336) on which the action is performed.

Illustratively, a capability 342 is a concept that is only known in the virtualization layer 310, i.e., the guest operating system is unaware of the capability. The capability 342 is essentially a mechanism to enforce security privileges among the hyper-processes 350 of the virtualization layer 310. Notably, each hyper-process 350 is provided only a minimal set of capabilities 342 necessary for that component to perform its assigned function. For example, the guest monitor 352 may have the capability to access the VM, while only the threat protection component 354 may have the capability to communicate with the guest monitor 352 and policy manager 356. Thus, an attacker that is able to compromise a hyper-process (protection domain 332) would only be able to inflict damage associated with the capabilities 342 held by that protection domain 332.

As described herein, certain events or activities, e.g., attempted access to hardware resources, of a guest process 240 may be treated as interception points that allow the virtualization layer 310 to further monitor or instrument the process using a spawned micro-VM. A system call is an example of an interception point at which a change in privilege modes or levels occurs in the guest operating system, i.e., from guest mode ring 3 (a lowest level of guest mode privilege) of the guest process 240 to guest mode ring 0 (a highest mode of guest mode privilege) of the guest operating system kernel 230. The guest monitor 352 may intercept the system call and examine a state of the process issuing (sending) the call. The instrumentation logic of threat protection component 354 may analyze the system call to determine whether the call is suspicious and, if so, instruct the guest monitor 352 to instantiate (spawn) one or more micro-VMs, managed by the guest monitor in cooperation with the threat protection component, to detect anomalous behavior which may be used in determining an exploit or malware.

As used herein, an exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed by an exploit to harm or co-opt operation of an electronic device or misappropriate, modify or delete data. Conventionally, malware may often be designed with malicious intent, and may be used to facilitate an exploit. For convenience, the term "malware" may be used herein to describe a malicious attack, and encompass both malicious code and exploits detectable in accordance with the disclosure herein.

Memory Virtualization

Figure 4:
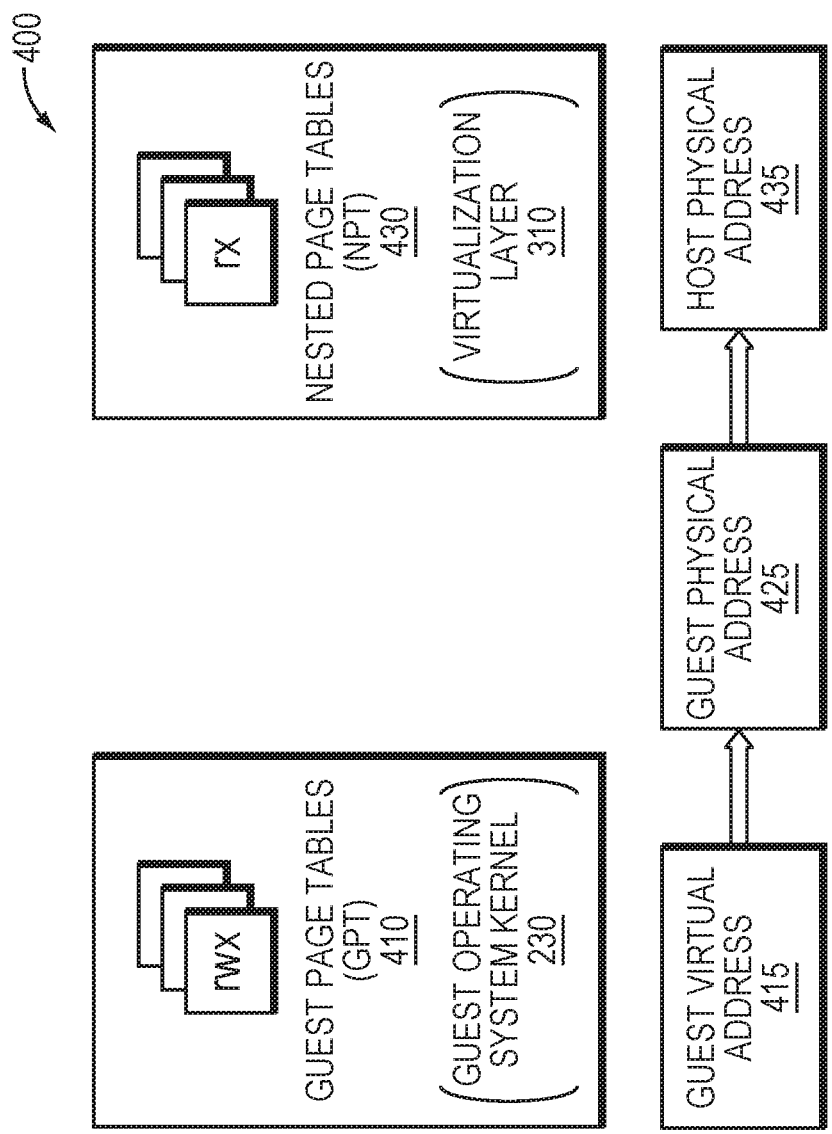
FIG. 4 is a block diagram illustrating memory virtualization that may be advantageously used with one or more embodiments described herein.

FIG. 4 is a block diagram illustrating memory virtualization 400 that may be advantageously used with one or more embodiments described herein. The guest operating system kernel 230 may create one or more sets of guest page tables (GPT) 410, wherein there is typically one set of guest page tables per guest process 240 that perform a first translation from a guest virtual (linear) address 415 to a guest-physical address 425. Each guest process 240 typically runs in its own address space of guest-virtual addresses; to that end, the guest operating system kernel 230 creates one or more guest page tables 410, e.g., in the form of a guest page table hierarchy, associated with the address space of the guest process 240. When switching guest processes for execution on the CPU 210 during a context switch, the guest operating system kernel 230 swaps a prior guest page table hierarchy (of a prior process) for the guest page table hierarchy of the (current) process to be executed.

Virtualization provides one or more additional page tables, i.e., nested page tables (NPT) 430, layered underneath (i.e., nested with) the GPT 410. The nested page tables 430 may be utilized to perform a second translation from the guest-physical address 425 to a host-physical address 435, wherein the host-physical address 435 is an address used to access (physical) main memory 220. The translation of guest-physical address 425 to host-physical address 435 may be flexible, i.e., such translation may be implemented on a per page basis to determine how each guest-physical address 425 is translated to a host-physical address 435. Illustratively, translation from guest-physical addresses to host-physical addresses is controlled by the virtualization layer 310 to establish a mapping from the guest-physical addresses used in a VM (e.g., the VM) to a host-physical address in main memory 220.

In an embodiment, guest page tables 410 are part of a guest page table hierarchy that is controlled by the guest operating system kernel 230, and the nested page tables 430 are part of a nested page table hierarchy that is controlled by the virtualization layer 310, e.g., managed by the micro-hypervisor 320 in cooperation with the guest monitor 352. In one arrangement where the MMU hardware supports nested paging, the page table hierarchies may be organized as a two-stage (i.e., layered) translation arrangement of the (physical) MMU 215 (supporting a virtualized MMU via two-level page table hierarchies), where the page tables define the translation of a guest-virtual address 415 to a guest-physical address 425 (a first stage defined by the GPT) and, ultimately, to a host-physical address 435 (a second stage defined by the NPT). There, the guest operating system kernel 230 manages the guest page tables 410, the virtualization layer 310 manages the nested page tables 430, and the nested page tables are consulted by the MMU after the guest page tables. Hence, the nested page tables may be used to override permissions.

In an alternative arrangement where the MMU hardware does not support nested paging (e.g., it can only perform one-level translation), the guest page tables may be organized as a shadow page table arrangement synchronized with the nested page table hierarchy such that the shadow page tables provide guest-virtual address to host-physical address translations that are updated with changes to the guest page table hierarchy or nested page table hierarchy. The virtualization layer 310 is responsible for folding the guest page tables 410 (managed by the guest operating system kernel 230) and the nested page tables 430 (managed by the virtualization layer) together to create the shadow page tables so as to perform end-to-end translation from guest-virtual addresses to host-physical addresses. The MMU 215 then uses the shadow page tables for translating guest-virtual addresses to host-physical addresses as a single level translation. Accordingly, the shadow page tables are updated when the guest page tables or nested page tables change. It should be noted that either arrangement may provide additional functionality, wherein each translation stage may define access permissions on a page granularity. That is, for each page referenced by a page table, access permissions may be specified as to whether the page is readable (r) writeable (w), or executable (x).

In an embodiment, the "ultra" (ultimate) translation to physical memory of the two-stage arrangement, i.e., the translation from guest-physical address 425 to host-physical address 435, may be employed to overwrite any page permissions that the guest operating system kernel 230 has defined. For example, assume the guest operating system kernel 230 has defined, using the GPT, a certain read (r), write (w), execute (x) mapping for a guest-virtual address 415 to guest-physical address 425 of a page accessible by a guest process 240, so that the guest process 240 may expect that it can actually read, write and execute that page. Yet, using the nested page tables 430 (i.e., layered beneath the GPT), the virtualization layer 310 may alter or change those permissions to be write protected, i.e., read-only (r) and execute (x) with no write permission, for the actual (host) physical page that the guest operating system kernel 230 (and guest process 240) may attempt to access. Therefore, any time that the guest process 240 attempts a write access to the page, an access violation of the nested page tables occurs, resulting in a VM exit (e.g., a transition) that returns control to the virtualization layer 310. Note that for the shadow page table arrangement, the violation occurs for a shadow page acting as a condensed two-stage address translation. In response to determining that the attempted write access is to a physical page that is write protected, the virtualization layer 310 may take action, such as emulating the access, making the page writeable, shadow copying the write, or completely nullifying the effects of that access. As another example, assume the guest operating system kernel 230 has marked the page as non-executable. The virtualization layer 310 may render the page executable or emulate the instruction that would have been executed if the page had been executed.

Late Load

The embodiments described herein provide a late load technique for deploying the virtualization layer underneath a running operating system executing on a node, such as an endpoint. Assume the operating system initially runs on the native hardware of the endpoint without the virtualization layer. The operating system, thus, has full control of the hardware resources, such that interrupts and direct memory access (DMA) transfers may be in progress, devices may be active, and one or more CPUs may be executing instructions. In other words, the operating system controls the entire hardware platform of the endpoint and manages (i.e., controls) the entire main memory as the state of the endpoint (and operating system) changes. Subsequently, it is desirable to deploy (slip) the virtualization layer underneath the running operating system so as not to disturb any existing operating system configuration and enable enhanced security available from the virtualization layer as previously described.

Figure 5:
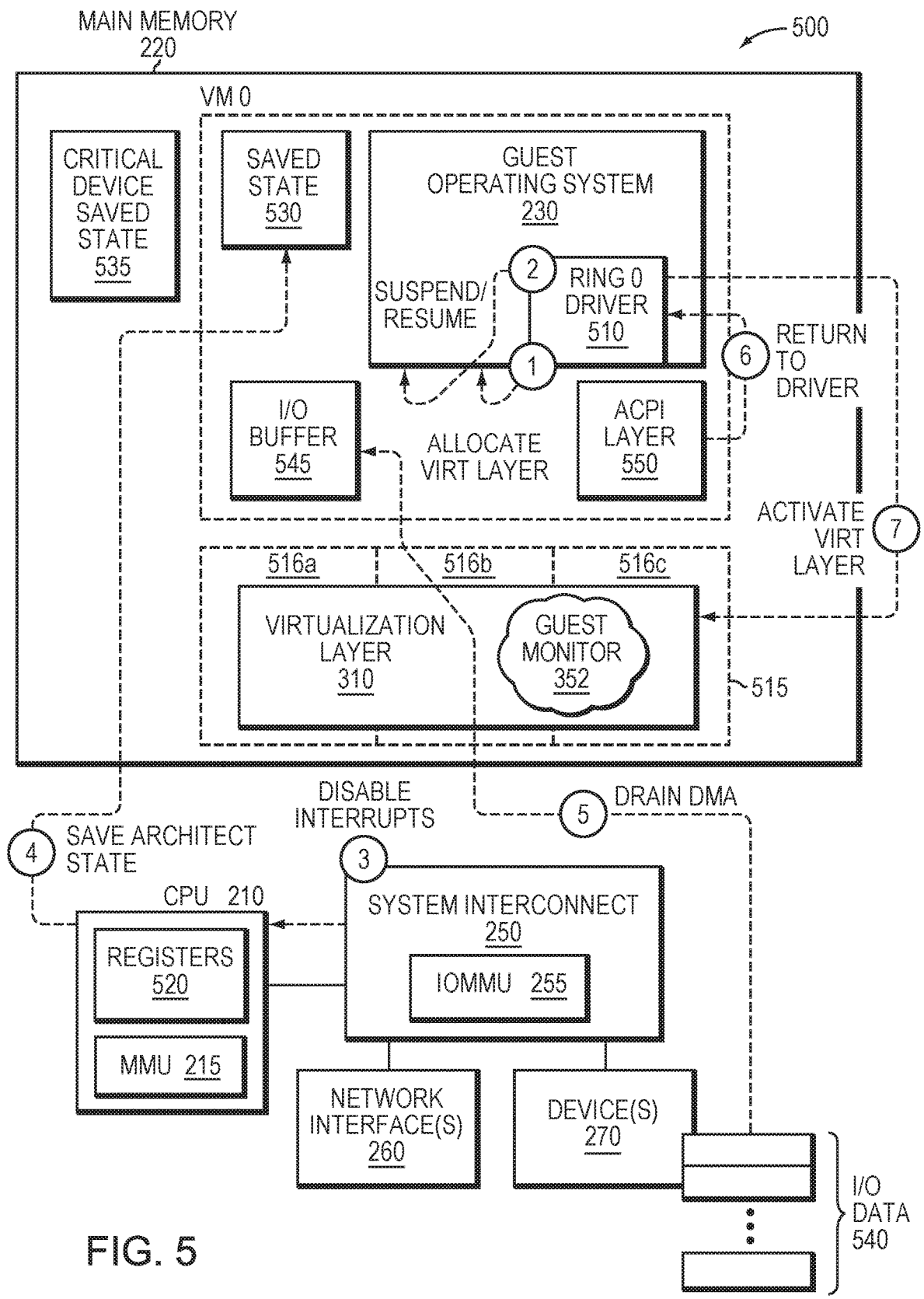
FIG. 5 is a block diagram of a late load technique for deploying a virtualization layer underneath an operating system executing on the node.

FIG. 5 is a block diagram of the late load technique 500 for deploying the virtualization layer 310 underneath an operating system executing on a node such as an endpoint. To deploy the underlying virtualization layer 310, a ring 0 driver 510 (e.g., a kernel module or kernel mode driver) having a highest privilege level of the operating system (hereinafter "guest operating system") is loaded in the memory 220 of the endpoint. In an embodiment, the ring 0 driver 510 may be installed in the guest operating system with the highest privilege level (e.g., a kernel mode driver in host mode ring 0) so as to allow the ring 0 driver to control the guest operating system and the hardware resources (e.g., stop the CPU and freeze a device). For example, a kernel mode driver may operate in ring 0 mode with ring 0 privileges of the Windows operating system, whereas a kernel module may be used to obtain such ring 0 privileges of the Linux operating system. The ring 0 driver may be loaded into memory 220 at any time when the guest operating system kernel 230 is engaged with active I/O operations, i.e., user processes and/or applications are running, while user I/O operations are in progress. Binary executable files (binaries) for the virtualization layer (e.g., the microhypervisor and hyper-processes) may be included in the ring 0 driver (i.e., binaries executed in the virtualization layer and not executed in the ring 0 driver); alternatively, the binaries may be loaded over the network 130 or from disk.

Once loaded, the ring 0 driver 510 may request allocation of physical memory 515 (e.g., a portion of main memory 220) from the guest operating system kernel 230 for the virtualization layer 310, e.g., via a memory allocation (kernel malloc) function of the guest operating system (denoted in FIG. 5 as indicator "1"). In an embodiment, the allocated physical memory 515 may include certain properties, such as (1) a non-direct memory accessible memory region, (2) a non-paging memory region, i.e., non-swappable to disk by the guest operating system, (3) a contiguous memory region to facilitate loading of the virtualization layer binaries, and (4) a reserved memory region, i.e., not accessed by the guest operating system after it is allocated. Illustratively, the physical memory allocated to the virtualization layer is embodied as a reserved, naturally-aligned contiguous region of physical memory, e.g., 4-8 megabytes or 0-8 megabytes of main memory, so that the virtualization layer may configure its page tables (NPT) with known fixed addresses in physical memory during boot. That is, in an embodiment, the physical memory 515 is allocated to the virtualization layer by the guest operating system as pinned kernel mode contiguous memory dedicated to a pseudo device controlled by the ring 0 driver, so that the memory is effectively no longer managed (i.e., accessed) by the guest operating system.

However, assume the guest operating system kernel 230 does not allow allocation of a physically contiguous memory region, but rather only allocates virtual memory via a limited number of virtual memory pages 516a-c at a time. According to the late load technique, the ring 0 driver 510 may employ an algorithm that requests allocation of a group of virtual memory pages 516 and then determines which of those pages, e.g., pages 516a-c, form a physically adjacent region 515 of memory sufficient for the virtualization layer binaries to reside in memory. Illustratively, the algorithm may examine virtual address descriptors within the guest operating system kernel to determine those pages 516 that point to the contiguous physical memory region 515 sufficient for accommodating the virtualization layer 310. The ring 0 driver may then retain those pages, release all other allocated pages and load the binaries at the contiguous physical memory region, which may be located anywhere in main memory, e.g., at any arbitrarily-aligned, physical address range. Accordingly, the virtualization layer 310 may be configured to be re-locatable within any arbitrarily-aligned contiguous region of physical memory.

The ring 0 driver 510 may then place the guest operating system into a quiescent state and take control of hardware resources, such as one or more CPUs 210 and devices (including security-critical devices such as interrupt controllers), of the node returning via a scheduler or a jump to an entry point of the ring 0 driver (denoted in FIG. 5 as indicator "2"). Specifically, the ring 0 driver may halt (freeze) the hardware resources in a deterministic manner, and capture and save one or more architectural states (e.g., contents of registers) of the resources, which may be used to create a virtual machine (VM) having an initial state that is substantially identical to the state of the node executing the guest operating system prior to deployment of the underlying virtualization layer. In an embodiment, the virtualization layer may provide the VM with direct access (i.e., pass through) to certain hardware devices, such as the network interface(s) 260. However, such direct access does not apply to the CPU 210 such that the virtualization layer 310 may gain control from the guest operating system kernel 230. Creation of the VM thus leads to creation of a virtual CPU resembling the physical CPU (i.e., behaves similar to the physical CPU) but that has a virtual (i.e., software controlled) state managed by the virtualization layer 310. Freezing (i.e., halting) of the CPU 210 therefore denotes placing the CPU in a controlled state where its registers 520 (and architecture in general) may be captured (e.g., via a snapshot operation) and saved to a portion of memory 220, thereby enabling the virtual CPU having the captured state from the (physical) CPU 210 to be recreated in the VM at a later time (e.g., restored as an initial state of the VM).

In an embodiment, the architectural states captured by freezing the CPU 210 may include, inter alia, the execution context states of the CPU registers, stack, and program counter, such that an environment of the VM may be recreated substantially similar to the environment that existed on the native hardware at the time of deployment of the virtualization layer 310. Illustratively, all CPU registers 520 (e.g., floating point unit registers, MMX registers, SSE registers, AVX registers and the like) may be captured including, e.g., the CPU core registers and memory management unit (MMU) registers to a saved state 530. More generally, any architectural state that cannot otherwise be preserved when the virtualization layer activates (e.g., the states of devices and interrupt controllers that change when initialized by the virtualization layer) is also captured and saved to the saved state 530. The saved state 530 is illustratively stored in a protected (i.e., isolated from the guest operating system) portion of the memory 220; however in an alternative embodiment, the saved state 530 may be persistently stored on a storage device of the devices 270. Devices initialized by the virtualization layer include various security-critical devices, such as the CPU(s) 210, MMU 215 and IOMMU 255 (i.e., any device related to interrupt delivery). Any portion of the memory 220 that is not accessed (touched) during the boot procedure of the virtualization layer (e.g., I/O buffer 545) may remain in place and, thus, need not be preserved when the virtualization layer activates. In addition to the CPU registers and devices initialized by the virtualization layer, the states of interrupt controllers (including those controllers programmed by the guest operating system kernel 230) are captured and saved for recreation in the VM (i.e., the initial state of the VM).

Capturing of the architectural state may be achieved by halting all activities of the various hardware devices (including the CPUs) in a way that their states do not change during the capture (i.e., non-destructive capture), such as disabling interrupts (denoted in FIG. 5 as indicator "3"). The ring 0 driver 510 may halt such activities by, e.g., forcing the CPUs to execute a loop (or halt) instruction, such that their architectural registers may be non-destructively read and saved. Illustratively, any DMA operation transfers already initiated by the hardware devices may be allowed to complete (drain) prior to reaching the deterministic state, e.g., I/O data 540 in-flight to I/O buffer 545. In addition, because of the asynchronous nature of DMA operations, i.e., it is undetermined precisely when the in-flight operations (e.g., DMA of I/O data 540) will complete (e.g., stored to I/O buffer 545), a time period for completion may be established where a threshold, e.g., 5 seconds, may be provided for completion of the DMA transfers. Alternatively, in-flight DMA operations may be allowed to continue as long as they do not access a memory region reserved for the virtualization layer 310 and, thus, do not obstruct the virtualization layer bootstrap (activation) procedure (e.g., DMA to I/O buffer 545 which is disjoint from memory 515 allocated to the virtualization layer).

In an embodiment, the late load technique may leverage a guest operating system suspend function and resume function to quiesce the node (endpoint) by, e.g., halting all activity of the hardware resources, saving the states of the resources while running directly on the node (i.e., underneath the running guest operating system) and, thereafter (i.e., once the guest operating system is running in the VM), restoring (resume) the saved states of those resources (denoted in FIG. 5 as indicator "2") so that the guest operating system is transparently reconstituted (i.e., without reboot to reconfigure the operating system state changes) in that virtual machine. That is, the suspend function may be used to capture and save the states of the hardware resources, which thereafter may be restored as the initial state of the VM using the resume function. The suspend and resume functions are specified according to the Advanced Configuration and Power Interface (ACPI) specification, available from The Unified Extensible Firmware Interface forum (UEFI) collaborative trade association at www.uefi.org, developed to establish industry common interfaces enabling robust operating system-directed device configuration and power management of devices and entire systems. Illustratively, a platform specific ACPI layer 550 cooperates with the guest operating system kernel 230 to implement the suspend/resume function.

The late load technique may leverage the suspend and resume functions by triggering a suspend event that directs the guest operating system kernel 230 to suspend (i.e., cease operation) and save (i.e., capture) the states of the resources (including the security-critical devices) and, thereafter, trigger a resume event to restore those states in the VM. For example, an application programming interface (API) of the guest operation system may be available to activate the suspend and resume functions (i.e., execute suspend and resume code) such that the guest operating system kernel performs the work of capturing and saving of the states of the hardware resources and later restoring those states on behalf of the virtualization layer. After the suspend completes, the CPU(s) 210 are halted such that control passes to the platform ACPI layer which awaits a resume event to continue operation of the node. In an embodiment where the guest operating system does not have the suspend and resume API exposed or cannot otherwise trigger such an event, the suspend and resume functions may be triggered manually (e.g., by user invoking a hardware trigger of the suspend function). Illustratively, the suspend and resume functions of guest operating system and/or ACPI layer may be modified (a first modification) so as to return control to the ring 0 driver 510 after completing the suspend rather than returning control to the ACPI layer 550 (denoted in FIG. 5 as indicator "7"). Accordingly, the suspend and resume code of the guest operating system (and/or the ACPI layer) is further modified (a second modification) so that at least one CPU core is not shut down, allowing control to be returned to the (still running) CPU core. Notably, using the suspend function triggered within the guest operating system ensures that pending (e.g., in-flight) DMA operations complete according to the states of the devices 270 as managed by the guest operating system, thereby ensuring no I/O data is lost and operation of the node appears seamless upon a later resume.

In an alternative embodiment, the late load technique may use the ring 0 driver to direct the guest operating system kernel 230 to suspend (i.e., cease operation) and save (i.e., capture) the states of the resources and, thereafter, restore those states in the VM.

After saving the states of all CPUs (except the CPU core on which the late load of the virtualization layer is performed) and acquiring a physically contiguous region 515 of memory at which the virtualization layer may reside, the ring 0 driver may suspend all hardware devices initialized by the virtualization layer in order to save their states. All other hardware devices may continue to retain their states after the virtualization layer boots (activates), because pass-through access is provided to all non-security critical devices for the guest operating system kernel 230 of the VM, i.e., drivers of the guest operating system kernel can directly access those hardware devices. However, for the security critical devices (such as interrupt controllers, MMU and IOMMU) the states are extracted from those hardware devices and saved in a portion of memory, e.g., a critical device saved state 535, illustratively organized as an agnostic data structure for consumption by the virtualization layer 310. Notably, the critical device saved state portion of memory may differ from the saved state 530, which is accessible by the guest operation system and/or ACPI layer. Accordingly, memory pages of the critical device saved state 535 may be isolated and later (after activation) protected by the virtualization layer as described further herein for protecting the memory 515 allocated for the virtualization layer.

Upon acquiring the physical memory, the ring 0 driver 510 may load the binaries of the virtualization layer 310 into the acquired memory and bootstrap (activate) the virtualization layer to create the virtual machine (VM) having the captured state and associated hyper-processes, e.g., a guest monitor (WM). The virtualization layer may then create a memory map where memory controlled by the VM (e.g., guest-physical memory) is mapped (e.g., one-to-one) to memory controlled by the virtualization layer (e.g., host-physical memory) except for the physical memory allocated for the virtualization layer to thereby hide the virtualization layer from the guest operating system. That is, the virtualization layer 310 may remap the guest-physical address layout of its memory region to hide the virtualization layer (including fixing up memory regions) from the guest operating system to ensure that the guest operating system cannot access (i.e., touch) that region. As previously described, the allocated memory for the virtualization layer may be pinned kernel mode memory dedicated to a pseudo device controlled by the ring 0 driver, so that the memory is no longer managed (e.g., accessed) by the guest O/S. Illustratively, for a node lacking an IOMMU, the one-to-one mapping results in identical address mapping that further ensures that at the time the guest operating system and the VM resume, any DMA operation transfers are directed to proper memory locations. Thus there is no remapping of memory for the guest operating system except to hide the virtualization layer, i.e., ensure that the acquired physical memory is not available to the guest operating system for inspection, modification and execution. Alternatively, the one-to-one mapping is not required for a node having an IOMMU, which provides guest-physical to host-physical memory mapping used by the virtualization layer.

Specifically, the virtualization layer may ensure that the acquired physical memory is not available to the guest operating system for modification by modifying the NPT 430 to prevent access by the guest operating system (VM) to that memory, thus essentially "unplugging" that memory from use by the guest operating system. If the guest operating system subsequently attempts to access pages of the allocated memory region, a page fault (NPT) violation may be triggered and handled by the virtualization layer as, e.g., an attempt to access non existing physical memory, such that a response to the attempted access returns all ones (a floating bus indicating that the memory pages are non-existent) or redirects the attempted access to different memory pages of the guest operating system.

Thereafter, the virtualization layer 310 may initialize the hardware resources with a configuration specified by the virtualization layer and create (emulate) virtual devices (such as virtual CPUs) for those resources initialized with the captured states of the resources prior to activation (e.g., bootstrap) of the virtualization layer. For example, the guest monitor (VMM) may read the content of the saved states and data structures (e.g., CPUs states, interrupt controller states) and emulate virtual devices having states identical to the states existing at the time of deployment of the virtualization layer. Illustratively, emulation of the virtual devices may occur for all devices that do not have hidden internal states, such as interrupt controllers, the MMU, the IOMMU and CPUs wherein extraction of states is possible. The virtualization layer may then bootstrap the VM. All virtual CPUs are initialized to their saved registers (i.e., captured from the suspend function) such that execution in the VM continues where the guest operating system left off when running on native hardware at the time of deployment (i.e., at a time of the guest O/S suspend) of the virtualization layer. Note that the CPU core used to create the VM and VMM continues running (e.g., after the instruction jump to the virtualization layer) in the ring 0 driver 510 such that the virtualization layer 310 can perform any post-virtualization layer launch cleanup, including triggering a resume event or releasing previously allocated memory pages. As noted, the suspend and resume functions are modified so as to return control to the ring 0 driver after suspending the guest operating system.

The virtualization layer may pass the states of any remaining resources (devices) directly through to the guest operating system and restart the virtual CPUs in the VM with their initialized states. As a result, the virtualization layer is deployed underneath the guest operating system of the virtual machine and configured to control the hardware resources, thereby permitting enhanced security of the node.

Figure 6:
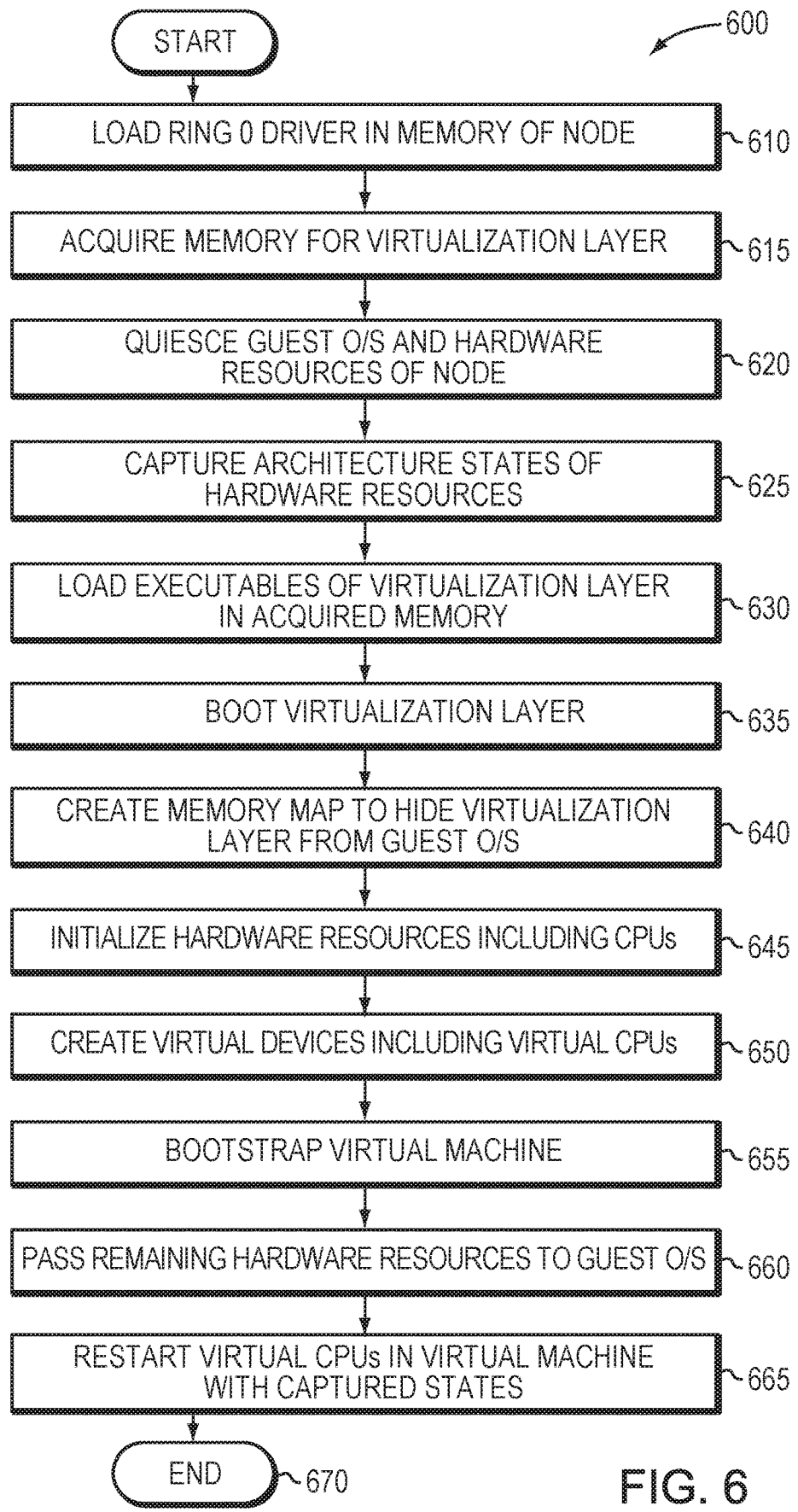
FIG. 6 is an example simplified procedure for deploying the virtualization layer underneath the operating system executing on the node.

FIG. 6 is an example simplified procedure for deploying the virtualization layer underneath an operating system executing on a node such as an endpoint. The procedure 600 starts at step 605 and proceeds to step 610 where, to deploy the underlying virtualization layer, the ring 0 driver is loaded in memory of the node. As noted, the ring 0 driver illustratively has a highest privilege level of the guest operating system and includes binaries for the virtualization layer. At step 615, the ring 0 driver acquires physical memory, e.g., from the guest operating system for the virtualization layer. At step 620, the ring 0 driver quiesces the guest operating system and hardware resources, such as one or more central processing units (CPUs) and devices (including security-critical devices), of the node. At step 625, the ring 0 driver captures (and saves) the architectural states of the resources, e.g., to allow creation of the virtual machine (VM) with an initialized state that is substantially identical to the state of the guest operating system executing on the node prior to deployment of the underlying virtualization layer.

At step 630, the ring 0 driver loads the binaries of the virtualization layer into the acquired memory and, at step 635, bootstraps (activates) the virtualization layer, e.g., to create the virtual machine and associated hyper-processes, e.g., a guest monitor. At step 640, the virtualization layer creates a memory map to hide the virtualization layer from the guest operating system, e.g., to map memory controlled by the virtual machine (e.g., guest-physical memory) to memory controlled by the virtualization layer (e.g., host-physical memory) except for the physical memory allocated for the virtualization layer. At step 645, the virtualization layer initializes the hardware resources (including CPUs) with its own configuration and, at step 650, creates virtual devices (including virtual CPUs) for those resources, e.g., initialized with the states of the resources prior to deployment of the virtualization layer. At step 655, the virtualization layer bootstraps the virtual machine. At step 660, the virtualization layer passes any remaining resources (devices) directly through to the guest operating system and, at step 665, restarts the virtual CPUs in the VM with their initialized states. At step 670, the procedure ends with the virtualization layer deployed underneath the guest operating system of the virtual machine and configured to control the hardware resources.

While there have been shown and described illustrative embodiments for deploying a virtualization layer underneath an operating system executing on a node of a network environment to enable the virtualization layer to control the operating system, it is to be understood that various other adaptations and modifications may be made within the spirit and scope of the embodiments herein. For example, embodiments have been shown and described herein with relation to quiescing of the endpoint and halting device activity (e.g., stopping device drivers) within the guest operating system using the suspend function of the guest operating system. However, the embodiments in their broader sense are not so limited, and may, in fact, enable quiescing of the endpoint by guest operating systems that do not support suspend/resume, i.e., there is no exposed suspend and resume API which the ring 0 kernel driver could invoke. To ensure that such a guest operating system is placed in a quiescent state when there is no ongoing DMA transfers or interrupt activity, all timers may be disabled to ensure that no interrupts are generated. Further, it is contemplated that the ring 0 driver may wait a sufficient period of time for any on-going DMA transfers to drain after the device drivers have stopped or halted. Notably, the DMA may be disabled in response to booting (activation) of the virtualization layer, which may cause all DMA activity to halt until the guest monitor re-enables DMA for the guest operating system. Note that the virtualization layer need only protect its own memory region, i.e., the allocated memory from the guest operating system storing the virtualization layer, (and not all memory) against such activity; accordingly, certain DMA transfers may remain in flight for the entire late load technique.

Moreover, certain guest operating systems, e.g., the Windows operating system, may use watch dog timers to detect excessive system suspend durations that trigger a system error (blue screen), which may occur during the activation period of the virtualization layer. One solution to this problem is to disable all timers (timing sources) of the guest operating system such that the operating system has no concept of time. Another solution is to take a snapshot of the current time from a watch dog timing source, e.g., a real-time clock (RTC), a time stamp counter (TSC) or, illustratively, a high precision event timer (HPET), while the ring 0 driver is saving the states of the hardware devices. As part of saving the states of the interrupt controllers, all interrupts may be masked to ensure that no interrupt activity can occur. Thus even if a timer expires, the corresponding interrupt is not fired (generated). Illustratively, when the virtualization layer boots, a second snapshot of the current time may be taken to determine the amount of time (i.e., time delta) needed to bootstrap the virtualization layer. The virtualization layer may then intercept a virtualized watch dog timing source and adjust (subtract) the time delta when the guest operating system attempts to access the timing source, thus preventing the guest operating from detecting an excessive suspend duration.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    suspending, by a kernel module executing on a node, a guest operating system and one or more hardware resources to a first state, the kernel module, residing in the guest operating system, having a first privilege level of the guest operating system;
    capturing and saving states of the one or more hardware resources by the kernel module executing on the node;
    requesting allocation of a portion of physical memory from the guest operating system for a virtualization layer;
    responsive to the request for allocation of the portion of the physical memory associated with the memory from the guest operating system by the kernel module being disallowed, the kernel module requesting allocation of a plurality of virtual memory pages and determining which of the virtual memory pages form a collective portion of the physical memory sufficient for the virtualization layer; and
    activating, by the kernel module executing on the node, the virtualization layer to create a virtual machine with an initial state that corresponds to a state of the node executing the guest operating system prior to deployment of the virtualization layer, the state of the node including the states of the one or more hardware resources.

2. The method of claim 1 further comprising:
    prior to suspending the guest operating system, acquiring, by the kernel mode executing on the node, the physical memory from the guest operating system executing by a processor.

3. The method of claim 1 further comprising:
    creating a memory map, wherein a first memory available to the virtual machine is mapped to a second memory being different from the first memory and controlled by the virtualization layer excluding the physical memory for the virtualization layer deployed logically underneath the guest operating system, thereby ensuring that the physical memory is not available to the guest operating system for inspection, modification or execution.

4. The method of claim 3, wherein the virtualization layer modifies a nested page table to prevent access by the guest operating system to the physical memory.

5. The method of claim 1, wherein the capturing and saving of the states of the one or more hardware resources is conducted by a suspend function operating as part of the guest operating system.

6. The method of claim 1 further comprising restoring the initial state of the virtual machine with the initial state by a resume function operating as part of the guest operating system.

7. A non-transitory computer readable medium including program instructions for execution within a node including data processing circuitry, a memory and one or more hardware resources, the program instructions, upon execution by the data processing circuitry, is operable to:
    suspend, by a kernel module residing in a guest operating system and executing on the node, the guest operating system and the one or more hardware resources to a first state;
    capture and save states of the one or more hardware resources by the kernel module executing on the node;
    request allocation of a portion of physical memory from the guest operating system for a virtualization layer;

responsive to the request for allocation of the portion of the physical memory associated with the memory from the guest operating system by the kernel module being disallowed, request allocation of a plurality of virtual memory pages and determine which of the virtual memory pages form a collective portion of the physical memory sufficient for the virtualization layer; and activate, by the kernel module executing on the node, the virtualization layer, deployed logically underneath the guest operating system, to create a virtual machine with an initial state that corresponds to a state of the node executing the guest operating system prior to deployment of the virtualization layer, the state of the node including the states of the one or more hardware resources.

8. The non-transitory computer readable medium of claim 7, wherein the capturing and saving of the states of the one or more hardware resources is conducted by a suspend function operating as part of the guest operating system.

9. The non-transitory computer readable medium of claim 8, wherein the program instructions upon execution by the data processing circuitry, are further operable to restore the initial state of the virtual by a resume function operating as part of the guest operating system.

10. A system comprising:
one or more hardware resources including data processing circuitry;
a memory communicatively coupled to the one or more hardware resources, the memory being configured to store a guest operating system initially controlling the one or more hardware resources, wherein
as the guest operating system is running, installing a virtualization layer while maintaining a current configuration of the guest operating system and enabling security available from the virtualization layer, the installing of the virtualization layer includes loading a kernel module having a first privilege level of the guest operating system into the memory, the kernel module is configured to (i) request allocation of a portion of physical memory associated with the memory from the guest operating system for the virtualization layer and (ii) request allocation of a plurality of virtual memory pages and determine which of the virtual memory pages form physical memory sufficient for the virtualization layer in response to the request for allocation of the portion of physical memory associated with the memory being disallowed.

11. The system of claim 10 operating as an endpoint.

12. The system of claim 10, wherein the kernel module, including the one or more binary executables associated with the virtualization layer, is installed in the guest operating system.

13. The system of claim 10, wherein the virtualization layer controls all memory accesses requested by the guest operating system.

14. The system of claim 10, wherein the kernel module, when executed by the data processing circuitry, is configured to resume saved states of the one or more hardware resources so that the guest operating system is transparently reconstituted, without a reboot of the system, in the virtual machine.

15. The system of claim 10, wherein the kernel module is a ring 0 driver.

16. The system of claim 10, wherein the kernel module is further configured to activate a suspend function of the guest operating system to halt activity by the one or more hardware resources and save a state associated with each of the one or more hardware resources.

17. The system of claim 16, wherein the kernel module is further configured to install the virtualization layer by at least bootstrapping the virtualization layer underneath the running guest operating system.

18. The system of claim 16, wherein the virtualization layer is configured to create a virtual machine and create one or more virtual devices corresponding to the one or more hardware resources, each virtual device of the one or more virtual devices being initiated with a state that is substantially identical to the saved state for a corresponding hardware resource of the one or more hardware resources.

19. The system of claim 16, wherein the kernel module is further configured to activate a resume function to restore each saved state associated with each of the one or more hardware resources.

20. The system of claim 19, wherein the suspend function is activated via an application programming interface (API) of the guest operating system.

21. The system of claim 10, wherein the security is provided by a virtual machine that is created based on saved state associated with each of the one or more hardware resources and the virtual machine having an initial state that is correlated to an operating state of the system prior to the installing of the virtualization layer.

22. The system of claim 10, wherein the virtualization layer includes a plurality of binary executable files.

* * * * *